United States Patent [19]

Heit et al.

[11] Patent Number: 5,582,287
[45] Date of Patent: Dec. 10, 1996

[54] DRIVE CHAIN FOR ACCUMULATION CONVEYOR

[75] Inventors: Martin A. Heit; John J. Wilkins, both of Cincinnati, Ohio; William C. Rau, Florence, Ky.

[73] Assignee: Western Atlas, Inc., Hebron, Ky.

[21] Appl. No.: 989,494

[22] Filed: Dec. 10, 1992

Related U.S. Application Data

[63] Continuation of Ser. No. 725,644, Jul. 3, 1991, abandoned.
[51] Int. Cl.$^6$ ........................................... B65G 13/07
[52] U.S. Cl. ........................ 198/803.01; 198/781.02; 198/781.09; 198/781.05
[58] Field of Search .................... 198/789, 790, 198/803.01, 783, 465.1, 850, 851, 833, 835

[56] References Cited

U.S. PATENT DOCUMENTS

| | | | |
|---|---|---|---|
| 2,954,113 | 9/1960 | Hibbard et al. | 198/803.01 |
| 3,047,130 | 7/1962 | Resener | 198/851 |
| 3,401,929 | 9/1968 | Stock | 198/790 |
| 3,465,489 | 9/1969 | Monaghan | 198/803.01 X |
| 3,581,875 | 6/1971 | Guis | 198/789 X |
| 4,074,805 | 2/1978 | Bodewes | 198/790 |
| 4,458,809 | 7/1984 | White et al. | 198/790 |
| 4,582,193 | 4/1986 | Larsson | 198/803.01 |
| 4,953,691 | 9/1990 | Janzen | 198/803.01 |
| 5,042,244 | 8/1991 | Worsley | 198/851 X |

FOREIGN PATENT DOCUMENTS

| | | | |
|---|---|---|---|
| 1132477 | 9/1982 | Canada | 198/803.01 |
| 0785140 | 12/1980 | U.S.S.R. | 198/803.01 |
| 1046164 | 10/1983 | U.S.S.R. | 198/803.01 |
| 1046165 | 10/1983 | U.S.S.R. | 198/803.01 |

*Primary Examiner*—James R. Bidwell
*Attorney, Agent, or Firm*—Morris I. Pollack; Martin P. Hoffman; Mitchell B. Wasson

[57] ABSTRACT

A zero-pressure accumulating conveyor including a bed defined by rotatable rollers mounted in parallel sidewalls and powered by an endless drive chain. Pneumatic actuators lift the drive chain into engagement with the rollers to empower same. Sensor rollers divide the bed into distinct zones. Sensor rollers are retained in operative position relative to the conveyor bed by unique sensor brackets. A primary sensor roller bracket includes a bore with a piston movable there within; the cooperating secondary sensor roller bracket is spring biased in a first direction. Valves, and pneumatic circuitry controlled by such valves, extend along the length of the conveyor. Such valves are operated by the primary sensor roller brackets to regulate the flow of air pressure into the bores of the brackets and into the actuators. The actuators, when the pressure therein is bled-off, allow the chain in a particular zone to drop out of contact with the rotatable rollers. When the bore in the primary sensor roller bracket is pressurized, the bracket moves in an arc that forces the sensor roller below the plane of the conveyor. In such position, the sensor roller is not actuated as items travel thereover, and the life of the accumulating conveyor is significantly extended.

29 Claims, 15 Drawing Sheets

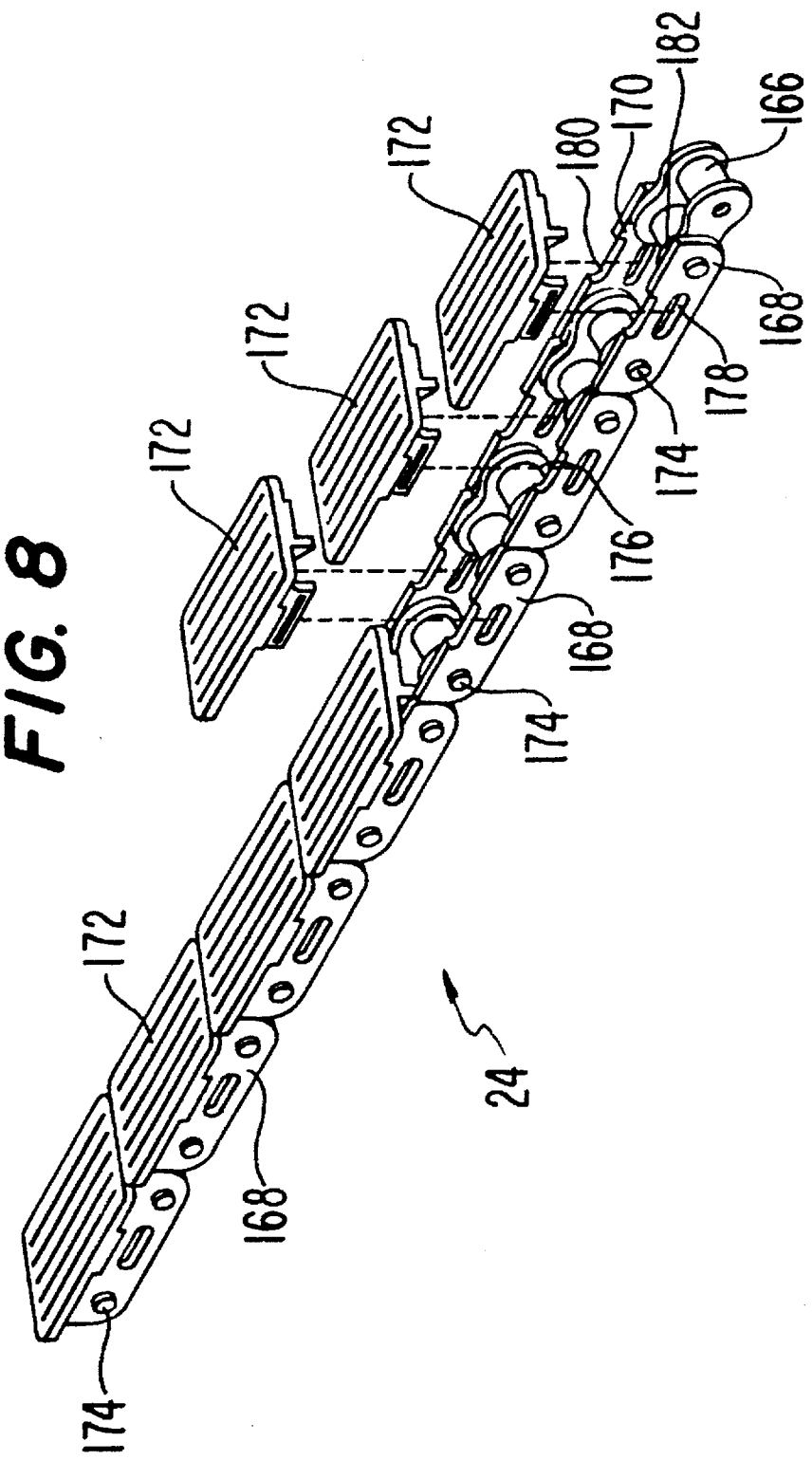

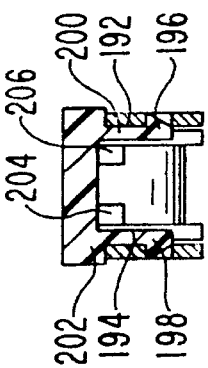
FIG. 12
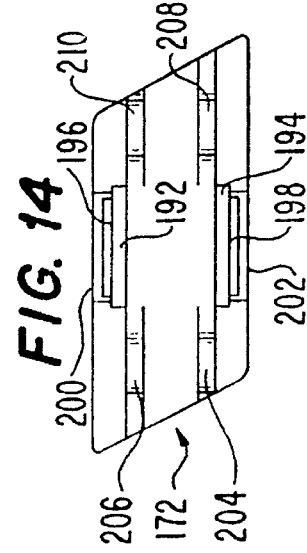
FIG. 14
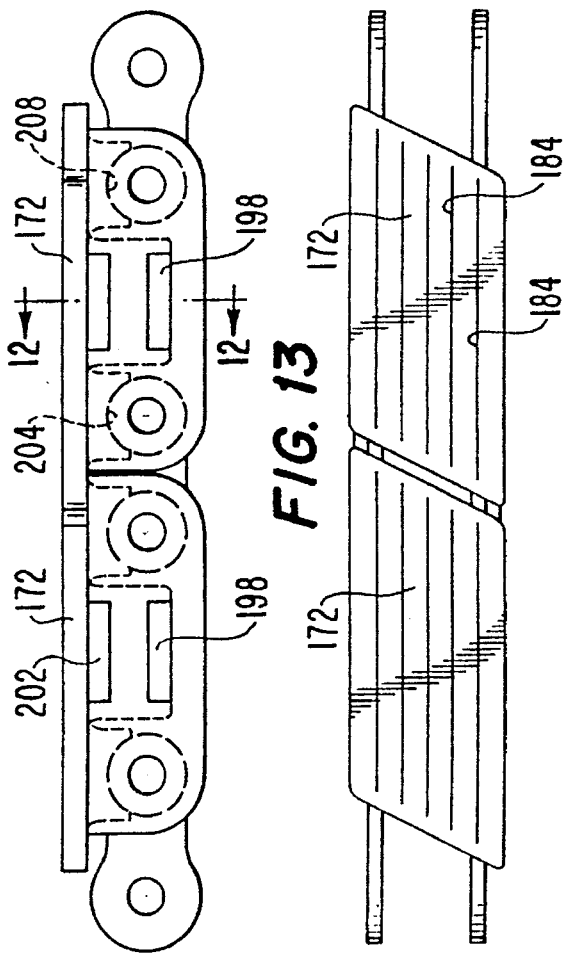
FIG. 11
FIG. 13
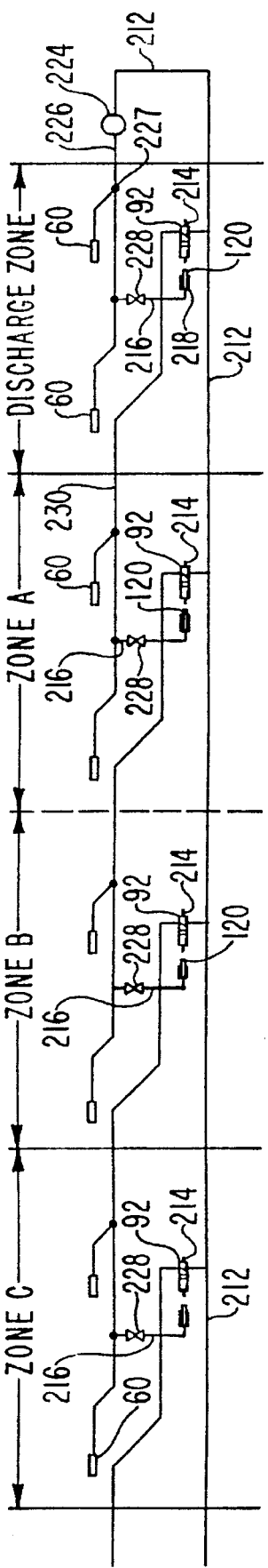
FIG. 15

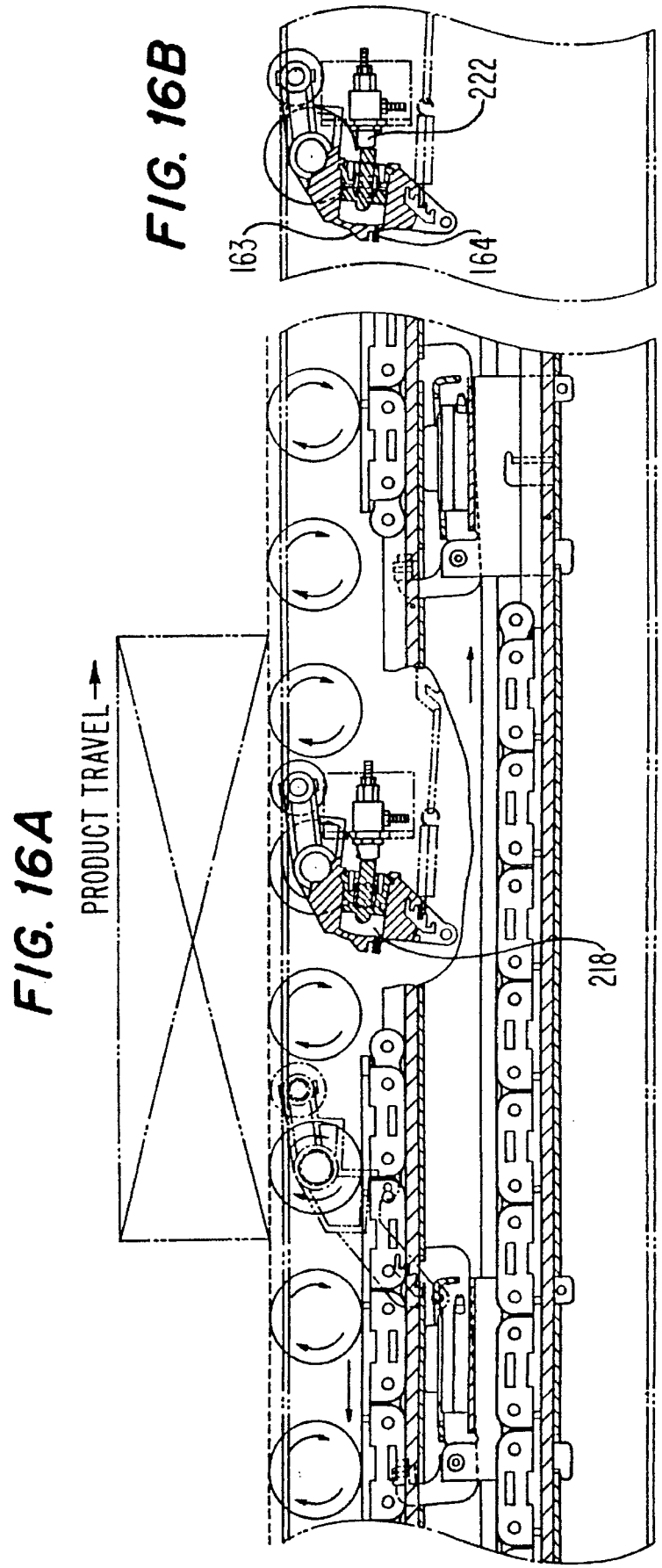

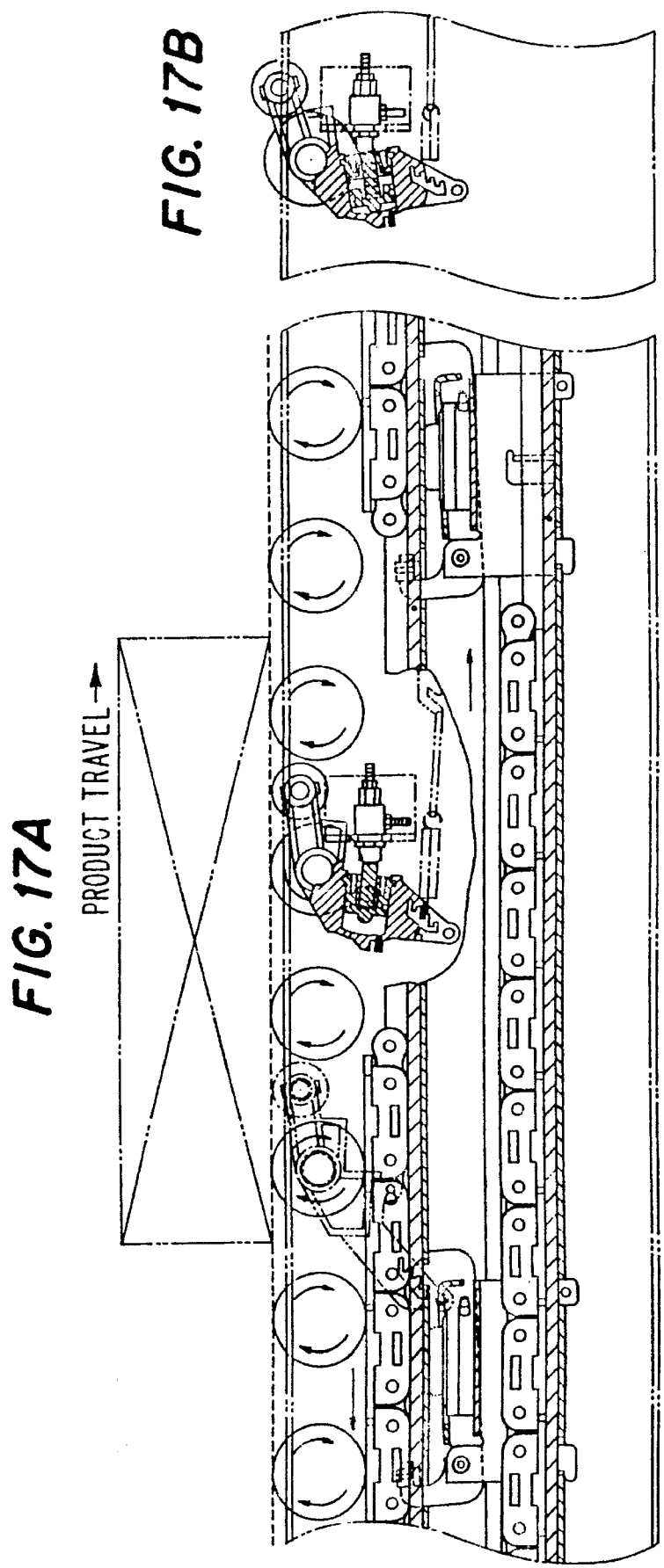

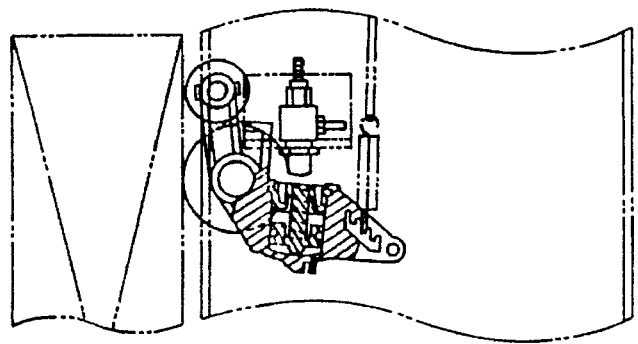
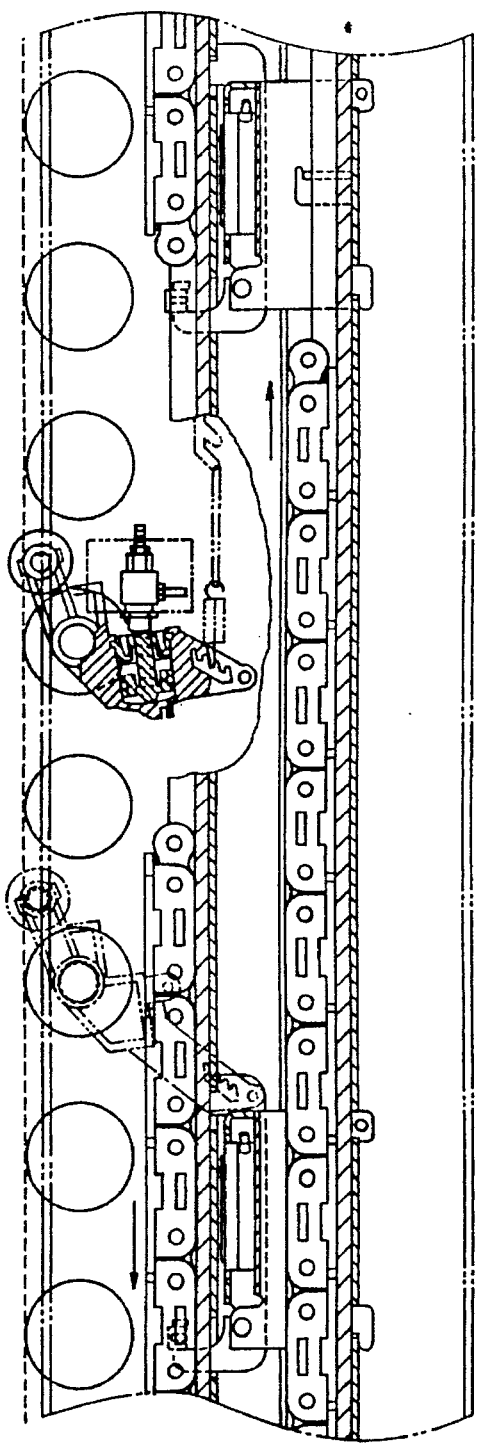

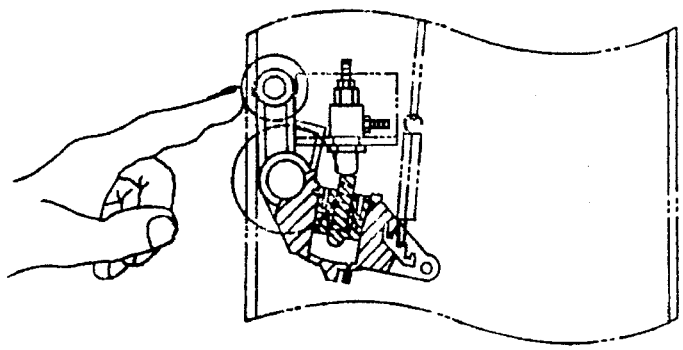
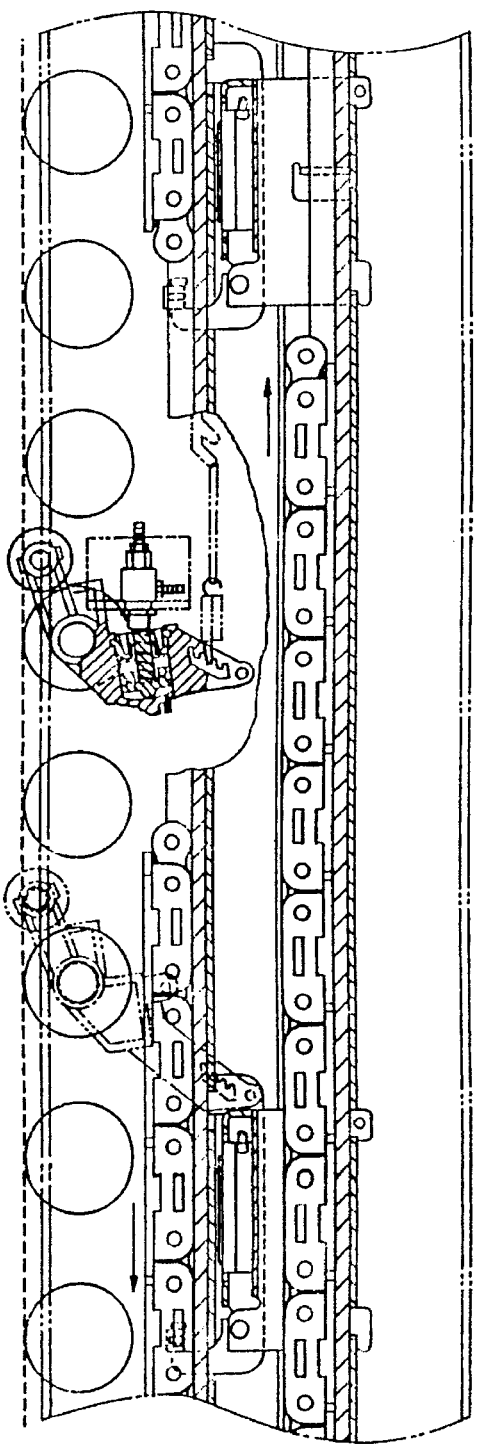

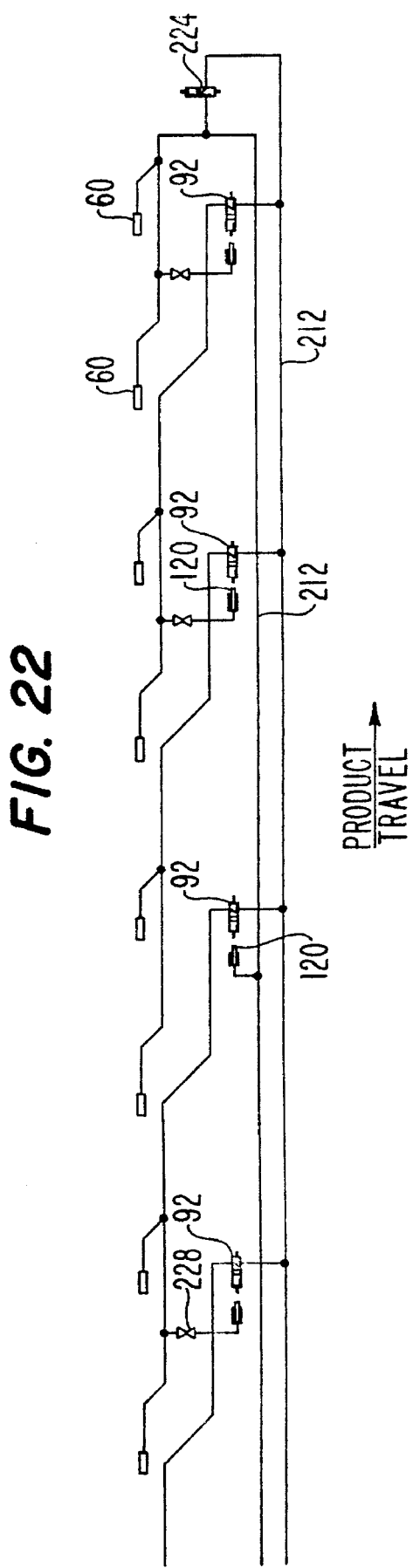

5,582,287

1

DRIVE CHAIN FOR ACCUMULATION CONVEYOR

This is a continuation of application Ser. No. 07/725,664 filed on Jul. 3, 1991, now abandoned.

FIELD OF THE INVENTION

This invention relates generally to accumulation conveyors, and more particularly to an accumulation conveyor in which the delivery, or non-delivery, of the propelling force to the rollers transporting the articles to be conveyed along the conveyor bed is pneumatically controlled by sensor assemblies and related circuitry.

BACKGROUND OF THE INVENTION

Powered accumulating conveyors are utilized wherever sorting, handling, processing, or other considerations, require that the conveyed items either (1) be stopped, or (2) bunched up, before proceeding down the conveyor bed. Conventional accumulating conveyors, which may be a hundred or more feet in length, are usually divided into "zones" that are nominally thirty-six inches in length. Each zone has a mechanism, such as a sensor roller, a mechanical trigger, a pneumatic switch, a photodetector, etc. that engages, and disengages, the driving power to the rollers of the preceding zone. When an accumulation operation is initiated, an external signal (which may be provided manually by a human operator or automatically by a timer control, or a computer program) disengages the rollers of the last, or discharge, zone. When the next item travelling down the conveyor bed depresses the sensor in the discharge zone, the sensor disengages the drive mechanism in the preceding upstream zone. When an item contacts the sensor in the preceding upstream zone, the process is repeated, in a series of steps, in each preceding upstream zone.

To illustrate, U.S. Pat. No. 3,612,248, granted Oct. 12, 1971, to Charles W. Wallis, discloses an accumulating roller conveyor comprising a plurality of longitudinally spaced, transversely extending article carrying rollers 10 with a belt 11 positioned beneath the rollers. Pressure rollers 12 are normally held in position against the belt to press the belt against the article carrying rollers by expansible chambers (30) to which fluid is supplied. A fluidic switch (16) is provided along the path of the articles, and when an article is stopped in position overlying the switch, the fluidic switch functions to deflate the expansible chamber, permitting the pressure rollers to move away from the belt, so that rotation of the article-carrying rollers is interrupted.

U.S. Pat. No. 3,768,630, granted Oct. 30, 1973 to R. A. Inwood et al, discloses a powered roller accumulator conveyor having a powered propelling member, such as belt 16, passing through a plurality of independent accumulating zones (zones A, B, C, etc.) arranged along the conveyor. The propelling member is shiftable between driving, and non-driving, positions (compare FIGS. 3 and 4), with respect to the powered rollers 14 by vertically shiftable, supporting rollers 18, operated by pneumatically powered actuators, such as tube-like member 30 and support plate 32, that engage one end of shaft 20 for roller 18. Each actuator is controlled by a series of valves 100 connected to a source 122 of fluid pressure, as shown schematically in FIGS. 7 and 8.

In the accumulating position of FIG. 7, each actuator is connected through an article-detecting sensor-operated valve 44 to the source of fluid pressure. The plunger 66 of valve 44 is influenced by sensor roller 49 that pivots flange 58 relative to the plunger, when a parcel contacts the roller. The shank 99 of the plunger 66 cooperates with ball valve 86 to control the flow of fluid away from the actuator 30. Each sensing assembly 46 is biased upwardly by spring 62 above the plane of the pressure rollers to be contacted by each object moving along the accumulator conveyor, as shown in FIG. 2. In an override or discharge position, shuttle valves 100 associated with each actuator are series connected to the source of fluid pressure, through a main control valve (such as three-way valve 131). The valves and are operative to direct the flow of fluid from the sensor operated valve 44, to energize each of the actuators 30, in each of the zones, to shift all of the operating zones into driving position.

U.S. Pat. No. 3,840,110, granted Oct. 8, 1974, to R. P. Molt et al, discloses a live roller, zero pressure accumulation conveyor 11, including a drive shaft 16 and a plurality of axially aligned countershafts 20. Each countershaft is driven by the drive shaft through a clutch 25 for selective power transmission to individual groups of conveyor rollers 14. Each group of rollers has, at its downstream end, a trigger device 51 (FIGS. 8 and 9) which senses the presence of a conveyed article. The trigger devices, which are operatively associated with air valves 52, 53, operate to selectively engage, and disengage, the clutch associated therewith, to achieve, and maintain, the desired spacing between articles being transported on the conveyor. Preferably, dual trigger devices (51x; 51y) are used in a manner which requires coincident actuation of both trigger devices before the clutch associated with a given group of rollers is disengaged (note column 3, line 6–column 4, line 5).

U.S. Pat. No. 4,108,303, granted Aug. 22, 1978, to R. K. Vogt and M. A. Heit, discloses an accumulator conveyor that includes a plurality of article accumulating zones A–E extending between the infeed and discharge ends of the conveyor. Each zone of the conveyor includes at least one power transmission assembly 17. All of the assemblies are powered by a single flexible drive member, such as an endless chain 56a, 56b. Each power transmission assembly includes a fluid ram 36, with a flexible diaphragm 58, which cooperates with a power wheel 37 to move that power wheel into, and out of, driving engagement with the article propelling member(s), such as rollers 11, within the zone that it serves. Operation of the transmission assemblies is controlled by a fluid control circuit 80. The fluid control circuit is influenced by sensor devices 18, which provide sensor valve 33, with a mechanical signal indicating whether, or not, an article is present, or absent, from a particular zone; the signal activates, or deactivates, the transmission assemblies 17 within the zone. As shown in FIG. 1, each sensor device 18 includes a sensor roller 19, a bracket 20, and a spring 28 for urging the sensor device to an operative position slightly above the plane of the upper surface of the rollers and/or roller bed.

Other accumulator conveyors are disclosed in U.S. Pat. No. 4,109,783, granted Aug. 29, 1978, to Robert K. Vogt; in U.S. Pat. Nos. 4,344,527 and 4,473,149, granted to Robert K. Vogt and Martin A. Heit, on Aug. 17, 1982 and Sep. 25, 1984, respectively.

BRIEF DESCRIPTION OF THE INVENTION

Under most circumstances, an item traveling along the bed of a known accumulating conveyor will strike the roller, or trigger, or other sensing member, of the sensor assembly associated with each successive zone. The roller will be depressed by the weight of the item, and will cycle, momentarily, the drive disengagement mechanism associated with the preceding upstream zone. Thus, for any given length of known accumulating conveyor, each sensor assembly will be actuated by each conveyed item.

This inflexible relationship in known accumulating conveyors results in inefficiency of operation, for the conveyed items are spaced out at least a zone apart, and because compressed air, or any other source of energy used to operate the sensor roller and drive engagement assemblies, will be wasted. Furthermore, the repeated, high speed striking of the items against the sensor roller, and the cycling of the drive engagement system, causes significant noise. The noise problem is accentuated in warehouses, distribution centers, assembly lines, and the like, where several conveyors are used side-by-side, and the noise build-up becomes intensified.

Even more significantly, the repeated, high speed, and, in some instances, almost constant operation of the sensor assemblies and drive disengagement mechanisms, contributes to increased maintenance requirements, and reductions in the operational life of the conveyor.

To counteract the known shortcomings of conventional accumulating conveyors, the instant invention contemplates sensor assemblies that may be lowered below the operating plane of the conveyor rollers, and raised, when needed, into an operative position above the operating plane of the conveyor rollers. Thus, the sensor assemblies, and the drive disengagement mechanisms controlled thereby, are not cycled continuously. The as-needed operation of the sensor assemblies, and drive disengagement mechanisms, enhances the efficiency of the conveyor, reduces the maintenance requirements, and extends considerably the operational life of the instant accumulating conveyor. A significant reduction in operating noise is also realized, and the reduction in component wear is unprecedented.

The instant accumulating conveyor is versatile, for the items accumulated on the discharge zone may be released therefrom in a singulation mode (serial fashion), or in a slug, or ganged fashion. In either event, the conveyor operates smoothly, with high throughput, and minimum spacing between items, yet without pressing against adjacent items with any force (zero pressure accumulation).

Furthermore, the instant accumulating conveyor is controlled by pneumatic circuitry that is operatively associated with the sensor assemblies for each zone; a valve is situated next to the bracket of each sensor roller assembly and is operated thereby. The pneumatic circuitry enables the driving mechanism in the preceding upstream zone of the conveyor to be disconnected rapidly and smoothly.

The instant sensor assembly includes a piston that moves within a cavity defined in the sensor bracket to extend a rod that raises or lowers the sensor roller. Upon movement of the sensor bracket the rod also operates an adjacent valve retained in a bracket secured to the frame of the conveyor. The valve is incorporated into the pneumatic circuitry for the preceding zone, and the valve operates a pneumatic actuator in the preceding zone. An endless chain extends between opposite ends of the conveyor, and the chain, when elevated, contacts, and drives, the rollers in the conveyor bed. Pneumatic actuators are located in each zone. Consequently, when the actuators are pressurized, the endless chain in the zone in question, is elevated and drives the rollers in that zone. The reverse is true, when the sources of pressurized air for each actuator is diverted, or bled to atmosphere, so that the actuator is retracted and power is removed from the conveyor rollers in that particular zone. The retraction of the actuator allows the endless belt to move away from the rollers in the zone under consideration.

The endless belt employed in the present accumulating conveyor also represents a marked improvement over conventional endless belts. More specifically, the endless belt contemplates a series of roller chain links retained between spaced side plates; the side plates are configured to receive plastic drive pad segments that snap into receiving recesses. Each drive pad segment is parallelepiped in shape. The unique belt configuration permits the belt to pass about the sprocket wheels at the opposite longitudinal ends of the conveyor without jamming. The drive pads contact the underside of the rollers for driving same, without slippage.

The sequence of steps for operating the instant accumulating conveyor also represents a marked departure from known conveyors. For example, the proposed method calls for normally maintaining the roller assemblies in a depressed, or lowered position, beneath the level of the conveyor bed. A command to "prime" or raise the sensing assemblies to operative position, is given only when necessary. Such method of operation contrasts starkly with the prior art technique of continuously maintaining the sensing assemblies, in primed or operative position, with the sensing element (usually a roller) extending above the plane of the conveyor bed.

Other significant advantages and advances realized by the instant accumulating conveyor, when contrasted with known accumulating conveyors, will become apparent from the ensuing description of the invention, when construed in harmony with the accompanying drawings.

BRIEF DESCRIPTION OF THE DRAWINGS

FIG. 8 is a perspective view of a length of the drive chain for the accumulating conveyor;

FIG. 11 is a side elevational view of a few links in the drive chain;

FIG. 12 is a vertical, cross-sectional view of the drive chain, such view being taken along line 12—12 in FIG. 11 and in the direction indicated;

FIG. 13 is a top plan view of the fragment of drive chain shown in FIG. 11;

FIG. 14 is a bottom plan view of a pad that is engaged with the roller links of the drive chain;

FIG. 15 is a schematic view of the pneumatic circuitry employed by the preferred embodiment of the accumulating conveyor;

FIG. 16A is a side elevational view of an upstream zone of the accumulating conveyor, with a portion of the drive chain cut away to show the lowered position assumed by the sensor roller assembly;

FIG. 16B is a similar, fragmentary view of the sensor roller assembly located downstream of the advancing item, such sensor roller assembly also being shown in its lowered position;

FIG. 17A is a side elevational view similar to FIG. 16A, showing the position assumed by the sensor roller assembly as an item travels thereover;

FIG. 17B is a view similar to FIG. 16B, but showing the primed position assumed by the sensor roller assembly prior to the arrival of the advancing item;

FIG. 18A is a side elevational view similar to FIG. 16A, but showing the elevated, sensing position assumed by the sensor roller assembly, and the drive chain in its lowered position;

FIG. 18B is a view similar to FIG. 16B, but showing the sensor roller assembly, in a downstream zone, being depressed as an article passes thereover;

FIG. 19A is a side elevational view similar to FIG. 16A, but showing the elevated, sensing position assumed by the sensor roller assembly, and the drive chain is in its lowered position;

FIG. 19B is a view similar to FIG. 16A, but showing the sensor roller assembly, in a downstream zone, being manually depressed.

FIG. 22 is a schematic view of the pneumatic circuitry employed in a second alternative embodiment of the accumulating conveyor.

DESCRIPTION OF PREFERRED EMBODIMENT

Figure 1:
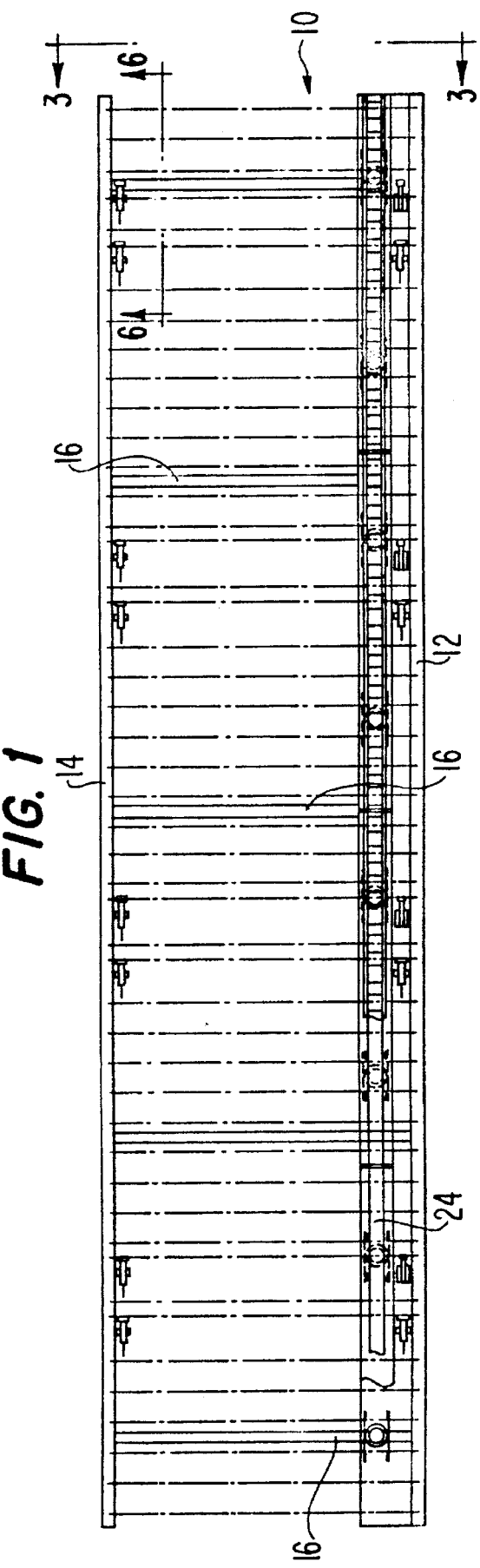
FIG. 1 is a top plan view of a portion of an accumulating conveyor constructed in accordance with the principles of the present invention.
Figure 2:
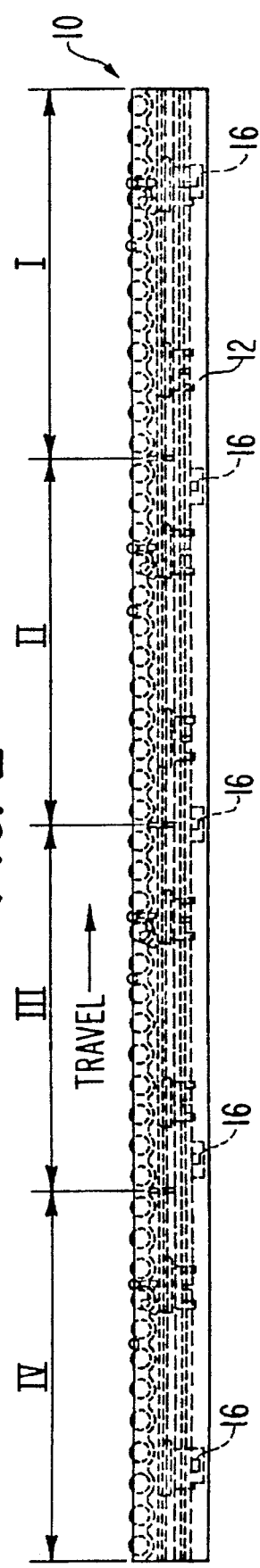
FIG. 2 is a side elevational view of the portion of the accumulating conveyor depicted in FIG. 1.
Figure 3:
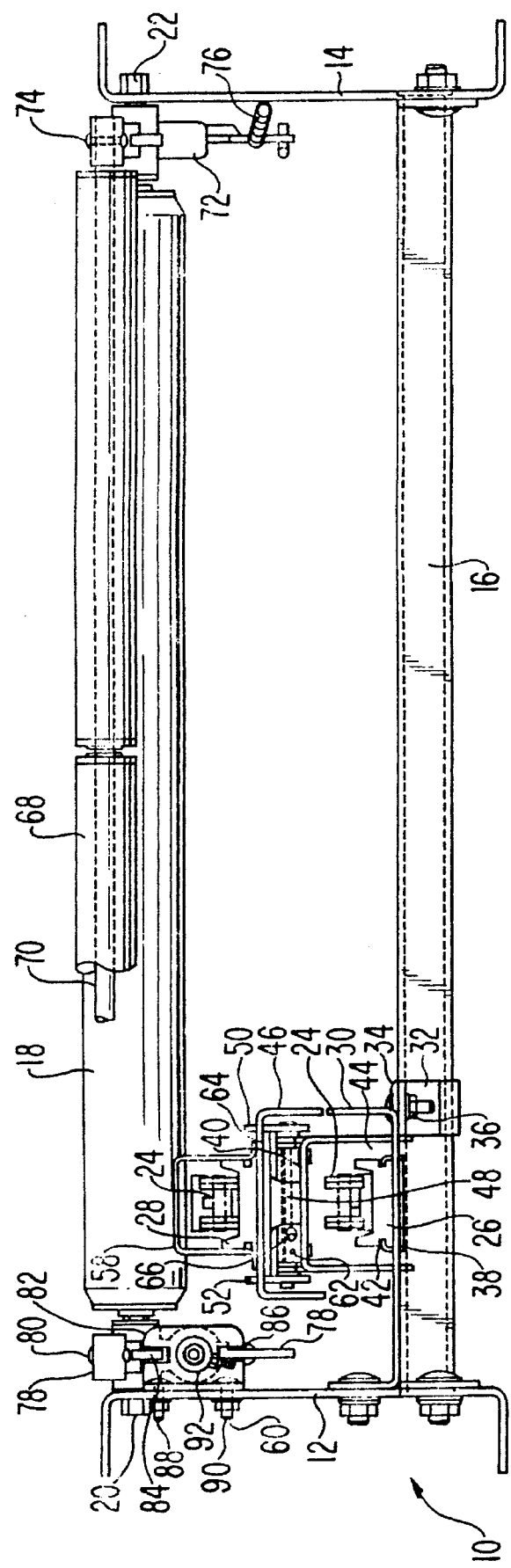
FIG. 3 is an end view of the accumulating conveyor, on an enlarged scale relative to FIGS. 1 and 2, such view being taken along line 3—3 in FIG. 1, and in the direction indicated.

FIGS. 1–3 show the overall organization of an accumulating conveyor 10 constructed in accordance with the principles of the present invention. Conveyor 10 includes a left side channel 12 and a right side channel 14 joined together by spreaders 16, located at regular intervals along the longitudinal axis of the conveyor. Spreaders 16 are rectangular in cross-section, as shown in FIG. 3, and impart structural rigidity to the conveyor. Conveyor 10 may extend a hundred feet, or more, in length; however, the conveyor is divided into several zones. In FIG. 2, for example, the intermediate section of conveyor 10 is subdivided into zones I, II, III and IV, which may be nominally three feet in length. The nominal width of conveyor 10, as measured between channels 12 and 14, is 30 inches, as suggested in FIGS. 1 and 3.

Cylindrical rollers 18 extend across the width of conveyor 10. The rollers may be spaced on three-inch centers along the length of the bed, and are of uniform radial dimension, so that rollers define a bed for the transport of items therealong. The center lines of the rollers are visible in FIG. 2, and spreaders 16 are also shown. As shown in FIG. 3, the ends 20, 22 of the central shaft of each roller 18 protrude beyond the ends of the cylindrical body. The ends fit into apertures defined in channels 12 and 14 to locate each roller in its position within the channels, as shown in FIG. 3. Each roller 18 rotates about its central shaft.

The cylindrical roller 18 retained in the sensor roller bracket assembly is foreshortened relative to those rollers defining the conveyor bed.

An endless drive chain 24 extends along the length of conveyor 10. An upwardly opening extrusion 26 receives the lower run of chain 24, while a second, upwardly opening extrusion 28 receives the upper run of endless chain 24. One leg of U-shaped control channel 30 is secured to channel 12 by bolts or other fasteners, while the base of channel 30 is secured to spreader 16 by fastening clip 32. A bolt 34 and nut 36 retains the clip 32 in fixed position, and a retainer 38 maintains the extrusion 26 in fixed position.

An inverted U-shaped housing 40 fits over the lower run of chain 24, and the depending legs of housing 40 fit through slots in channel 30. Ears 42, 44 project inwardly from the depending legs of housing 40 to contact extrusion 26. An inverted U-shaped lift channel 46 fits over housing 40, and is spaced therefrom by tab 48. Stabilizers 50, 52 keep lift channel 46 from shifting during lifting operations. A finger guard 58 fits over the upper run of chain 24.

A pneumatic actuator, indicated generally by reference numeral 60, is situated between the lift channel and housing 40. Actuator 60 comprises a cylindrical base 62, and an expansible bladder 64; pneumatic pressure is introduced into the actuator via a supply line connected to barb 66. When pressurized, bladder 64 expands and elevates lift channel 46 and finger guard 58, and the upper run of chain 24, relative to the rollers 18.

Figure 4:
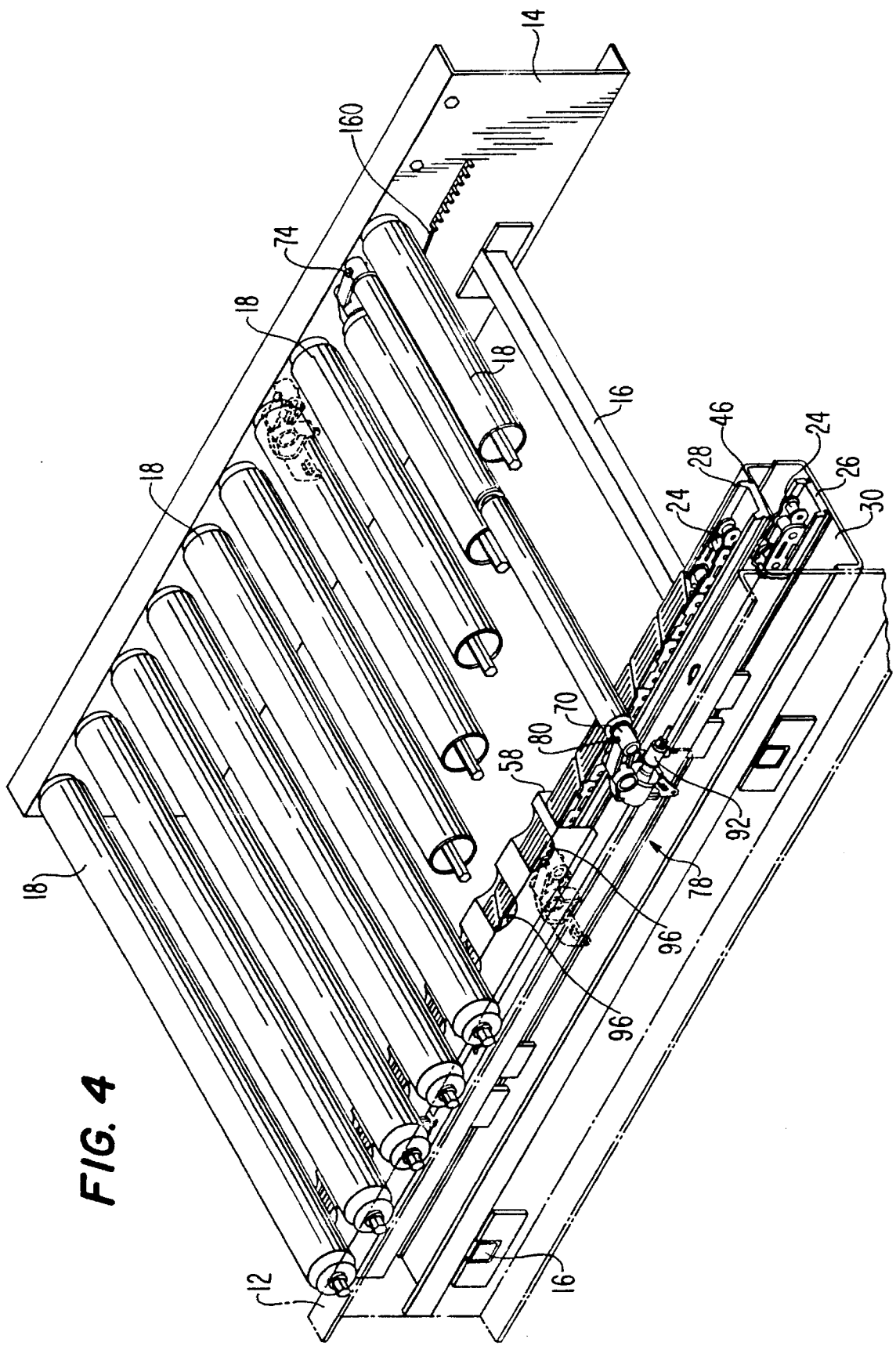
FIG. 4 is a perspective view of a portion of the accumulating conveyor of FIGS. 1–3, with fragments of the rollers broken away, to reveal, inter alia, a drive chain, a primary sensor bracket, a sensor roller, a valve operatively associated with the bracket, and a secondary sensor bracket.

FIGS. 3 and 4 (on an expanded scale) reveal that at least one sensor roller 68, with a unique bracket assembly for retaining same, is situated in each zone along the length of conveyor 10. Each sensor roller is somewhat less in diameter than rollers 18, and may be formed of two cylindrical sections joined together at the center line of the conveyor to the central shaft 70 that extends laterally through the sensor roller. Sensor roller 68 and central shaft 70 are joined together, and move in concert. Shaft 70 extends laterally between channels 12 and 14, but is not secured directly to either channel, and is mounted for movement relative thereto. The end of shaft 70 inboard of channel 14 is received in a secondary sensor roller bracket 72. A roll pin 74 is driven through the bracket and shaft 70 to join same together. A spring 76 is secured to bracket 72, while the other end of the spring is secured to channel 14 to establish a bias upon the bracket 72, and sensor roller secured therein.

The end of shaft 70 inboard of channel 12 is received in a primary sensor roll bracket 78 that is more sophisticated than unitary molded plastic bracket 72 (as will become apparent at a latter juncture in the description). A roll pin 80 is driven through bracket 78 and shaft 70 to join same together. An L-shaped valve mounting bracket 82, with cut-outs 84, 86, is secured to channel 12 by bolts 88, 90 adjacent to sensor roll bracket 78; a valve 92 is joined to the bracket. Lug 94 on bracket 78 fits within cut-out 84 so that the movement of bracket 78 may be aligned with valve 92 in bracket 82.

FIG. 4 is a perspective view of a zone of accumulating conveyor 10 with fragments of rollers 18 broken away to show the interrelationship of spreader 16 and channels 12 and 14; channel 12 is shown only in dotted outline to show details of the drive chain 24, lift channel 46, and other components that would otherwise be hidden from view. Portions of finger guard 58 are also broken away to show details of the drive chain 24, upper extrusion 28 for receiving chain 24, etc. Finger guard 58 has series of scalloped cut-outs 96 defined in its upper surface; one roller 18 fits into each opening, and the curved surface of the cut-out receives a roller. When lift channel 46 is in its unactuated, or lowered position, chain 24 passes freely a slight distance below the rollers. When lift channel 46 is elevated by the operation of a pneumatic actuator 60, the upper surface of chain 24 contacts the underside of rollers 18 and imparts a positive drive thereto.

Figure 5:
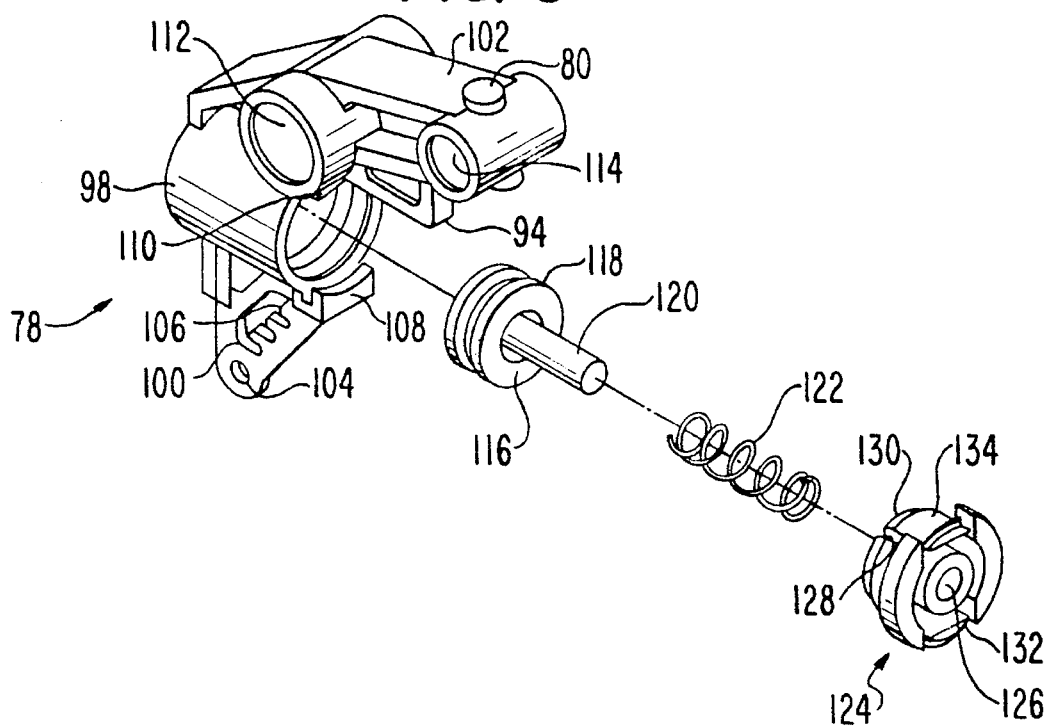
FIG. 5 is an exploded perspective view of the primary sensor bracket of FIG. 4, such view being taken on a greatly enlarged scale.

Primary sensor bracket 78 is shown in operative relationship to valve 92 adjacent channel 12; bracket 82, which supports valve 92, is shown in dotted outline in FIG. 4. The structural details of primary sensor roll bracket 78 are shown in FIG. 5, on an enlarged scale.

Bracket 78 comprises a unitary molded plastic body including a centrally located, outwardly opening body 98 of generally cylindrical shape, a depending leg 100, and an upwardly, and forwardly, extending arm 102. An opening 104 is formed through the leg 100, and a comb 106 is defined between the opening and the body 98.

Diametrically opposed seats 108, 110 are formed at the entrance to the body 98 of bracket 78. Cylindrical apertures 112, 114 are defined in arm 102, and lug 94 extends below arm 102. Aperture 112 receives the end 20 of a foreshortened roller 18, while aperture 114 receives the central shaft 70 of a sensing roller 68. Roll pin 80 is used to join the shaft 70, and sensing roller 68, to primary sensing bracket 78.

Body 98 of bracket 78 opens outwardly to receive a piston 116 with a seal 118 positioned about its perimeter, and an axially extending piston rod 120. A spring 122 fits about rod 120, and bears against piston retainer 124. Piston retainer 124 is a molded plastic component with an axial bore 126 passing therethrough; the bore is sized to receive the free end of piston rod 120. The body of the retainer is divided by longitudinal slits 128, and has a tapered entry surface 130, so that the retainer can be forced into the open end of body 98 against the urging of spring 122. The slits 128 allow arcuate segments 132, 134 to be flexed inwardly; once the retainer is seated within the bore in the cylindrical body 98, the fingers flex outwardly to engage with seats 108, 110 and the retainer is firmly seated within the body of bracket 78.

Figure 6:
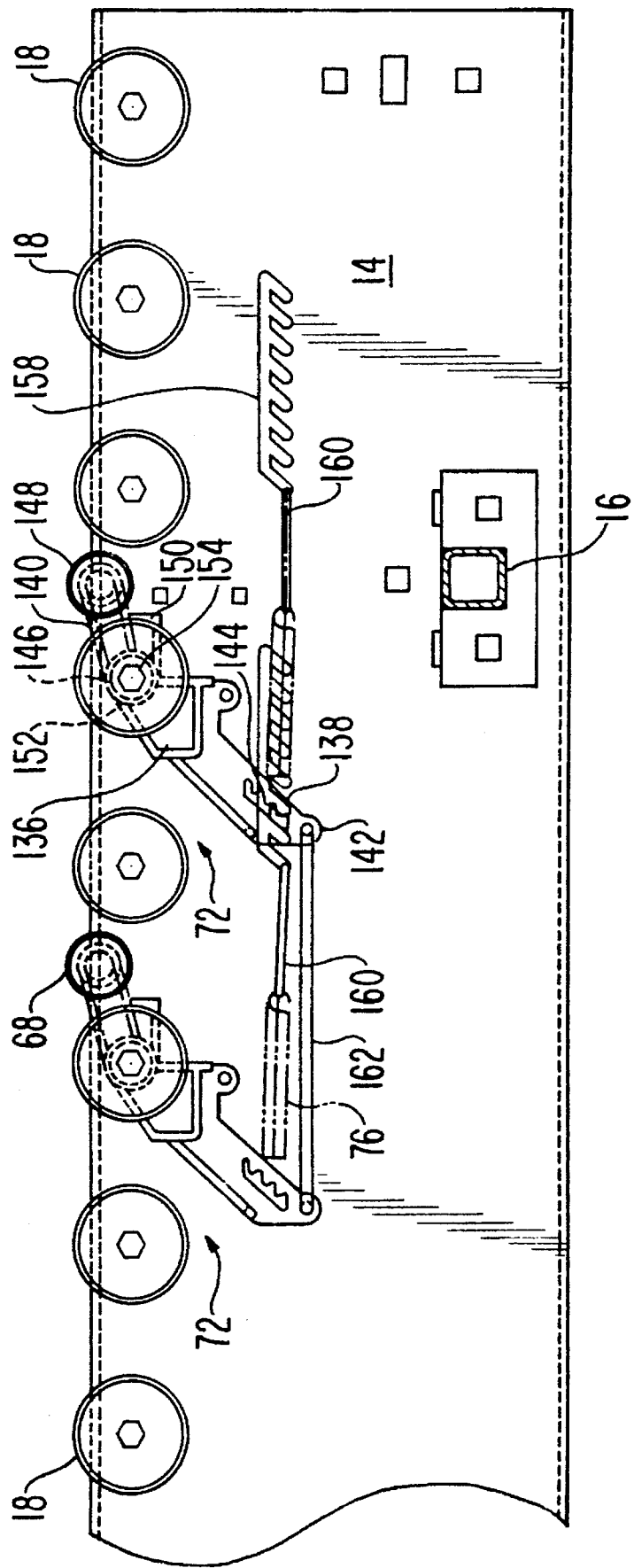
FIG. 6 is a vertical, cross-sectional view of a fragment of the accumulating conveyor, on an enlarged scale, such view being taken along lines 6—6 in FIG. 1 and in the direction indicated.

FIG. 6 shows the details of a secondary sensing bracket 72, which functions in concert with primary sensing bracket 78, and receives the opposite end of shaft 70 upon which sensing roller 68 is mounted. A pair of secondary sensing brackets may be joined together, to function in concert, within a single zone of the conveyor, for improved accuracy.

Examining secondary sensing bracket 72, which is located inboard of channel 14 and in alignment with primary sensing bracket 78, secondary sensing bracket 72 comprises a planar body 136, a depending leg 138, and an upwardly, and forwardly extending arm 140. An opening 142 is formed through the leg 138, and a comb 144 is defined between the opening and the body. Cylindrical apertures 146, 148 are defined in arm 140, and a lug 150 extends below arm 140.

A plastic bushing 152, with a hexagonal bore 154, is inserted into aperture 146 to receive the end 22 of the foreshortened roller 18. Roll pin 74 secures the sensor roller 68 within the aperture 148. A similar plastic bushing is used in the primary sensor bracket to receive the opposite end 20 of foreshortened roller 18.

Several notches 158 are cut through the channel 14, and a hook 160 is slipped into one of the notches. One end of spring 76 is slipped into engagement with hook 160, and the opposite end of spring 76 is engaged with one of the notches in comb 144 in the secondary bracket 72. The bias of spring 76 biases secondary bracket 72 counterclockwise, so that sensor roller 68 is positioned above the plane of the bed defined by rollers 18, as shown in FIG. 6. The sensitivity of the sensor assembly can be adjusted by shifting hook 160 laterally into engagement with a different notch, and/or by shifting spring 76 vertically into a different step in comb 144.

A sensor roller 68, plus its bracket assembly including primary bracket 78 and secondary bracket 72, usually function admirably and accurately in detecting items passing thereover, and responding accordingly. However, when tote boxes with cut-out intermediate sections, or badly warped or twisted packages, pass along the conveyor bed, at high speeds, individual sensor rollers have occasionally been defeated or have misfunctioned. Consequently, to combat such extraordinary circumstances, longitudinally spaced sensor rollers 68 are linked together by a rigid connecting rod 162. One end of the rod 162 fits into opening 142 is one secondary bracket 72, while the opposite end fits into opening 142 in an adjacent bracket 72.

Figure 7:
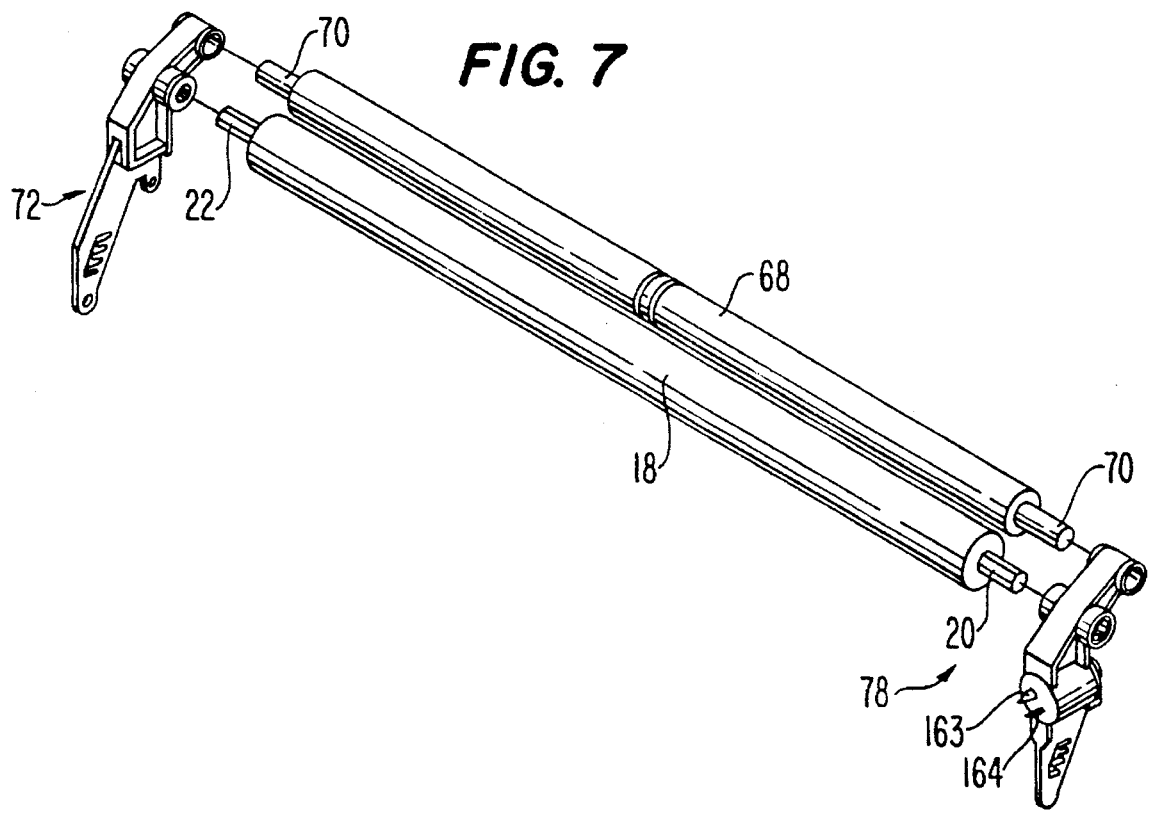
FIG. 7 is an exploded, perspective view of a sensor assembly including a sensor roller, a roller, a primary bracket, and a secondary bracket.

FIG. 7 shows, in an exploded perspective view, a sensor roll assembly comprising a primary sensor bracket 78, a secondary sensor bracket 72, a foreshortened roller 18 with projecting ends 20 and 22, and a sensor roller 68 retained upon shaft 70. A nipple 164 is visible on the rear surface of body 98 of primary sensor bracket 78. The nipple allows thin plastic tubing (not shown) to be slipped thereon, for purposes to be described at a later juncture in the specification. A protuberance 163 serves as a protective barrier for nipple 164, and prevents same from being snapped off in transit, and/or in installation or during periodic maintenance.

Figure 9:
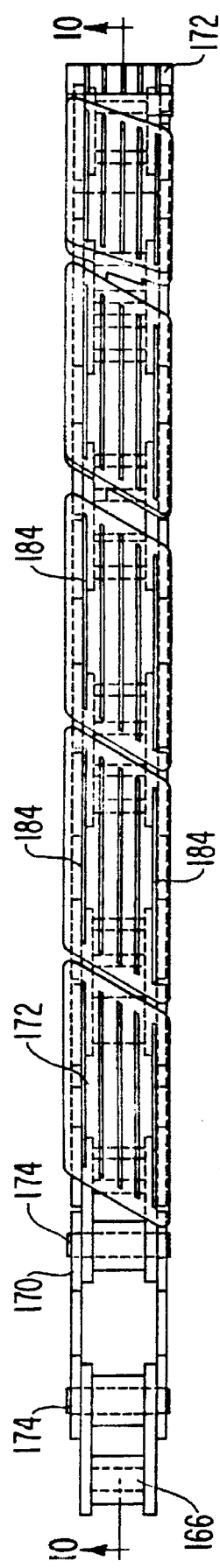
FIG. 9 is a top plan view of the length of drive chain over a fragment of the drive sprocket.

FIG. 8 depicts a length of endless chain 24 that selectively contacts rollers 18, and, when in contact, imparts rotational force thereto. Endless chain 24 includes standard roller chain links 166 retained between side plates 168, 170. Plastic drive pads 172 are snapped into locking engagement with side plates 168, 170. Some of the drive pads 172 in FIG. 8 are shown positioned above the side plates 168, 170, prior to being manually joined thereto. The parallelepiped shape of drive pads 172, when viewed from above, is shown in FIGS. 9 and 13. That parallelpiped shape is, in fact, a well recognized quadrilateral configuration and, as clearly shown in FIGS. 8, 9, 13 and 14, for pads 172 includes a rectangular body portion or area with parallel side edges and right triangle end portions arranged with the hypotenuse of each such right triangle parallel one to the other. The relatively short leg of each such right triangle comprises an extension of a respective side edge of the rectangular body portion of pad 172; while the relatively long leg of each such right triangle corresponds to a respective end of the body portion or area of its pad 172.

Each pin 174 extends transversely through side plate 168, roller link 166, and plate 170, so that the roller may pivot relative to the side plates. A notch 176 is formed in the upper surface of side plate 168, and a slot 178 is formed below the notch, in vertical alignment. A matching notch 180 is formed in the upper surface of side plate 170, and a slot 182 is formed below the notch 180. The upper corners of the side plates are substantially square to provide additional support for the drive pads.

FIG. 9 shows that each drive pad 172, because of its parallelepiped configuration, extends over more than one pair of side plates 168, 170 and roller links 166. At least the leading edge of the parallelepiped extends a small distance over the preceding link in the endless chain; while the corresponding trailing edge extends a similar small distance over the following link in the endless chain. Such shape reduces the chatter usually associated with rectangular drive pads on padded chains and also insures that contact with the rollers 18 can be maintained, at all times, when the rollers 18 are driven by the drive chain 24. Parallel grooves 184 are molded, or scored, in the drive surface of each drive pad 172 to enhance the contact area, and effectiveness, of pads 172 when such pads are engaged with rollers 18.

Figure 10:
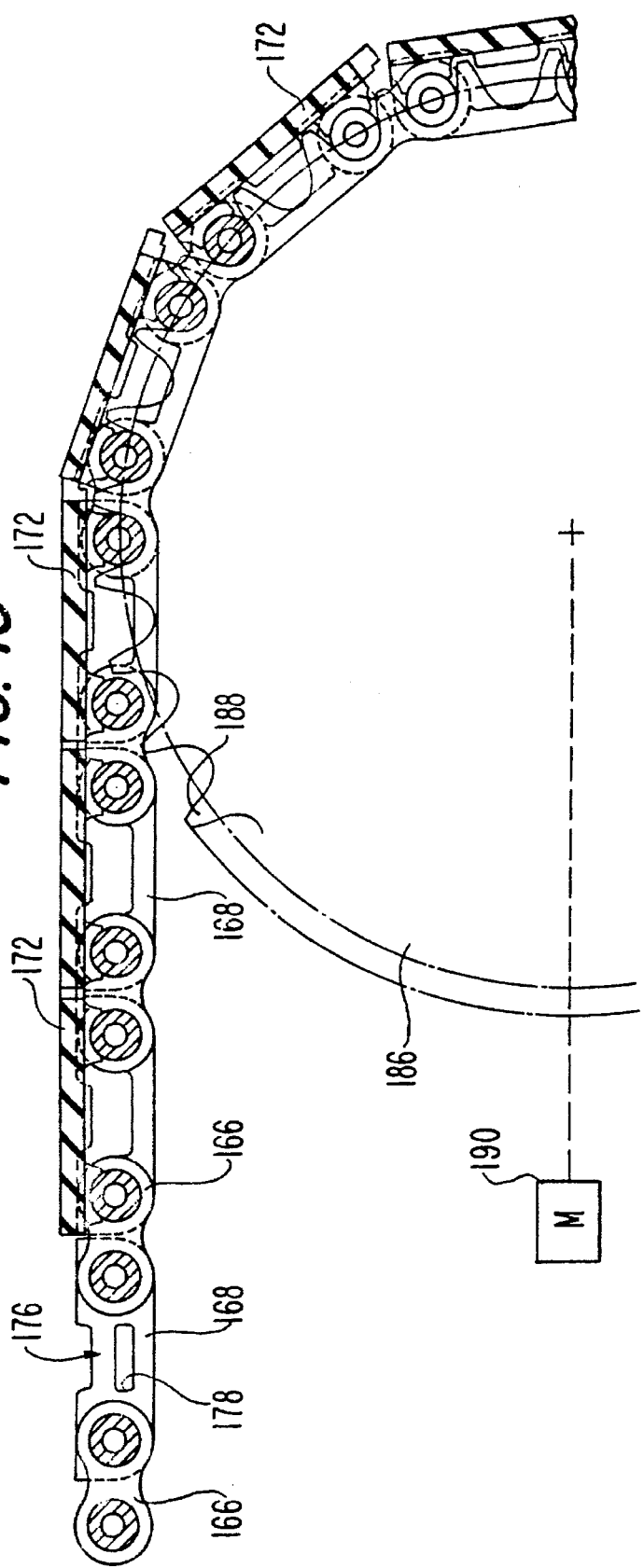
FIG. 10 is a vertical, cross-sectional view of the drive chain and a fragment of the drive sprocket about which the drive chain passes, such view being taken along line 10—10 in FIG. 9 and in the direction indicated.

FIG. 10 shows the manner in which endless chain 24 engages the drive sprocket 186. The teeth 188 on the drive sprocket project upwardly between side plates 168, 170 and the roller links 166 fit into the valleys formed between adjacent teeth 188, so that the chain conforms to the curvature of the sprocket. An electrical motor 190, indicated schematically by reference numeral 190 rotates drive sprocket 186 to deliver rotational forces to rollers 18, when the drive chain is elevated into contact with the rollers. A gear reducer (not shown) may be interposed between motor 190 and the shaft upon which the sprocket is secured. Drive sprocket 186 is located at the inlet, or head end, of the accumulating conveyor. A similar sprocket (not shown) is located at the tail, or discharge end, of the conveyor; thus, the endless chain 24 extends the length of the conveyor in an upper run, and a lower, parallel, run.

Figure 20:
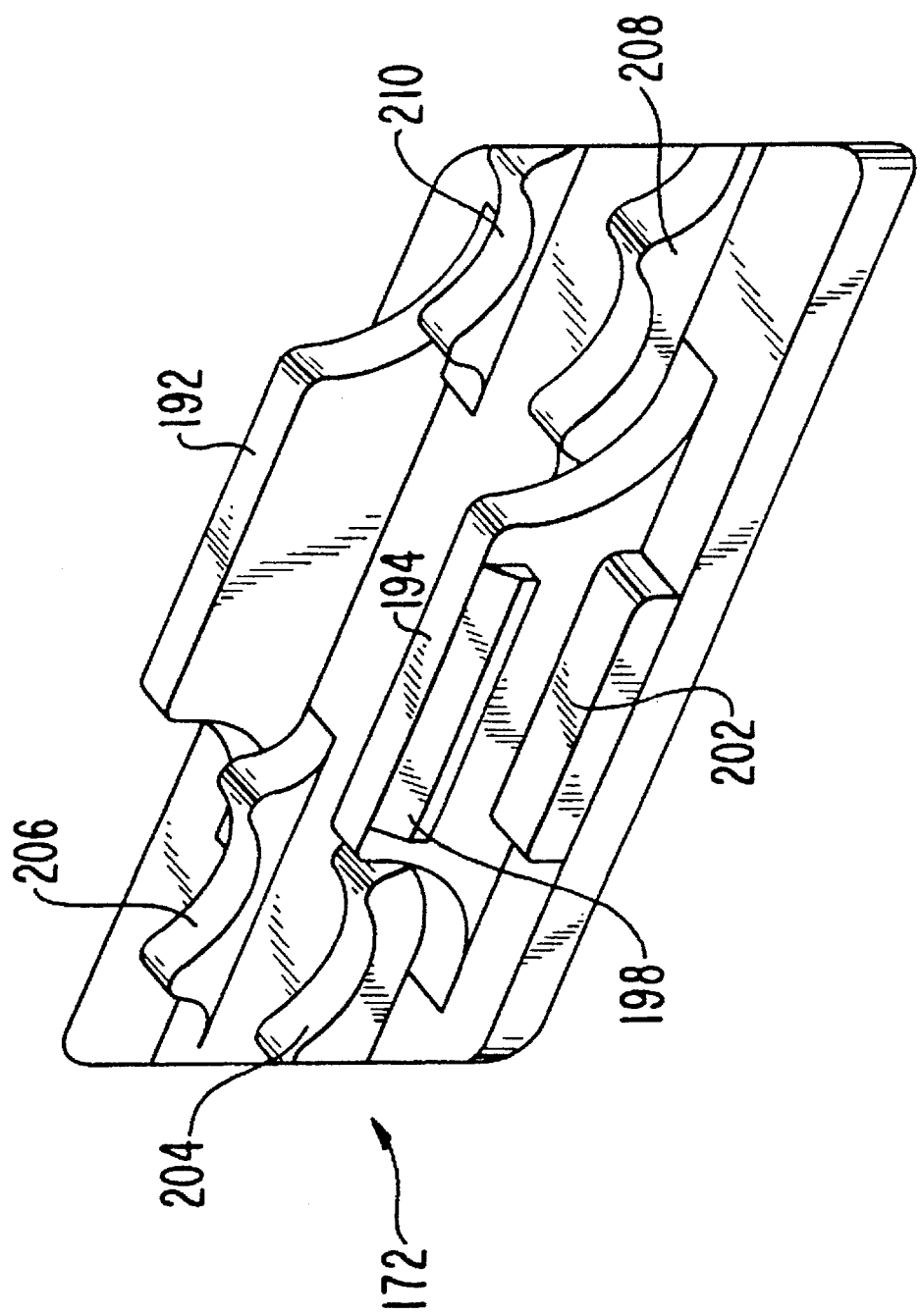
FIG. 20 is a perspective view of the underside of the pad shown in FIG. 15, such view being taken on an enlarged scale.

FIGS. 11–13 show the manner in which each drive pad 172 is snapped into engagement with the side plates 168, 170 of the endless chain 24, while FIGS. 14 and 20 show the underside of a drive pad 172. Each drive pad 172 is a unitary molded plastic component, including a planar drive surface with grooves 184, and a pair of tongues 192, 194 spaced inwardly from the sides of the drive pad. Tongues 192, 194 fit between side plates 168, 170, and outwardly projecting lugs 196, 198 are formed at the lower end of the tongues. A first projection 200 is formed adjacent one side of drive pad 172, and a second, identical projection 202 is formed adjacent the other side.

Arcuate saddles 204, 206 are formed near one edge of the drive pad, along its underside, while arcuate saddles 208, 210 are formed near the other edge of the drive pad. Each drive pad 172 is pressed downwardly into seating engagement with the side plates 168,170 of the endless chain 24. Thus, tongues 192, 194 are pressed downwardly until projecting lugs 196, 198 flex outwardly into slots 178, 182; projections 200, 202 fit into notches 176, 180 in the side plates. Saddles 204, 206 and saddles 208, 210 fit about the roller links retained between side plates 168, 170. The tongues, lugs, projections, seats, etc. are molded within close tolerances so that the drive links can readily be snapped into engagement with the endless chain, and can be removed therefrom, for replacement, as necessary.

FIG. 15 schematically shows a pneumatic circuit for accumulating conveyor 10. The circuit extends the length of the conveyor, although only four zones are shown, starting with the discharge zone,, and traveling upstream, including zones A, B, and C. Pressurized air, such as may be found in an air line in a shop or factory, or may be supplied from a compressor, is introduced into line 212, and pressurizes the entire line, throughout all zones. Valves 92 are normally biased closed by springs 214, so that actuators 60 are isolated from the pressurized air in line 212. However, when external control 224 is operated, air travels over line 226 and through a y-connection 227 to actuators 60 in the discharge zone. The pulse operates actuators 60 which raise lift channel 46 to place drive chain 24 in contact with rollers 18 to empower same.

The air also passes through branch line 216 and pressurizes the bore 218 in primary sensor roller bracket 78. Piston rod 120 is then extended to depress the button 222 of the normally closed valve 92 and opens same. The opening movement of valve 92 allows the pressurized air in line 212 to flow into the branch line for the next upstream zone and thence through valve 92 to operate the actuators 60 associated with such zone. The actuators, as shown in FIGS. 3 and FIGS. 16A–19B, elevate the lift channel for the endless chain 24 in the selected zone, and drive pads 172 on chains 24 are pressed into engagement with the undersides of rollers 18 in such zone. In the schematic circuit of FIG. 15, the opening of valve 92 in the discharge zone, enables operation of actuators 60 in zone A; the opening of valve 92 in zone A enables operation of actuators in zone B. The actuators for each zone are operated in a particular, step-by-step fashion, starting from the discharge end of the accumulating conveyor, and moving serially, or zone-by-zone, toward the inlet, or head end, of the conveyor.

CYCLE OF OPERATION

Specific structural components and subcombinations of a preferred embodiment accumulating conveyor 10 have been illustrated in FIGS. 1–15, and described in detail in the specification. However, FIGS. 16A–19B, inclusive, correlate the various subcombinations and components of the accumulating conveyor, by describing a cycle of operation for the accumulating conveyor.

The sensor assembly for each zone of accumulating conveyor 10 includes a sensor roller 68 which is deflected, or depressed, by articles passing thereover, as shown in FIG. 18B. A primary sensor bracket 78 and a secondary sensor roller bracket 72 position the sensor roller relative to the cylindrical rollers 18 that define the bed of the conveyor. The brackets also transmit the pivotal motion, or deflection, of the sensor roller 68 to valve 92, which is positioned adjacent to primary sensor bracket 78, in each zone. Spring 76 biases sensor roller 68 to its operating, or primed, position slightly above the plane of the bed of the conveyor. The force of spring 76 also pivots primary sensor bracket 78 so that piston rod 120 maintains pressure upon control valve 92.

While FIG. 5 shows the components of primary sensor bracket 78 in an exploded perspective view, FIG. 16A depicts the components in an assembled, operative condition. Bracket 78 has a cylindrical body 98 and piston retainer 124 is seated at the open end of the bore 218 in the cylindrical body. Piston 118 can be driven within bore 218, so that piston rod 120 projects outwardly through the bore 126 in retainer 124. Spring 122, which is received in the retainer and fits about the piston rod 120, resists the movement of the piston and piston rod. Seal 118 on the periphery of the piston contacts the inner surface of the bore 218, and contains the fluid pressure in the bore.

Barb 164 opens into bore 218. An end of air line 216 (see FIG. 15) is shown slipped over barb 164, for such line delivers fluid pressure to the bore to move piston 116 against the opposing force of spring 122.

Valve 92 is a three way valve, that is normally biased closed by spring 214, which is shown schematically in FIG. 15, but is located within the valve housing. A button 222 projects laterally from valve 92 toward primary sensor roll bracket 78, and the free end of piston rod 120 contacts the button. Button 222 is biased outwardly from the body of the valve by internal spring 214. The button is retained on the free end of a stem extending laterally through the body of the valve. The travel of the button and stem is but a few hundredths of an inch. A suitable low contact pressure type valve, requiring minimal movement for actuation, is available from Clippard Valve Co. of Cincinnati, Ohio, and is further identified as Clippard #CS-959.

When pressure is introduced from air line 216 into bore 218 via barb 164, piston 116 overcomes spring 122 and pushes the free end of piston rod 120 against button 222. The bushing 152 serves as the axis of rotation for brackets 72, 78, and sensor roller 68 retained therein. Thus, the sensor assembly rotates clockwise to a "lowered" position at, or below, the operating plane of the bed of the conveyor rollers 18. Such position is shown in FIGS. 16A and 16B.

Barb 164 at the rear of the body 98 of primary sensor roll bracket 78 is connected to the air line 216 leading to the pneumatic actuators 60 in the same zone in which the sensor roller bracket assembly is physically located. Each air line 230 extends from the valve 92 in the following, downstream zone. In this way, when an accumulation operation is initiated, air pressure is bled off at the last, or discharge, zone, by an external control 224 (shown in FIG. 15). Such external control may assume the form of a solenoid valve. The venting of air allows the bladders 64 of pneumatic actuators 60 to retract and permit lift channel 46, with the upper run of endless drive chain 24, to move out of engagement with the underside of rollers 18, so that the rollers in the adjacent upstream zone are no longer driven, as shown in FIG. 18A. Also, venting the pressure in bore 218 in primary sensor roller bracket 78 forces the piston rod 120 to retract into the bore 98 under the urging of spring 122. Load spring 76, connected to secondary sensor roller bracket 72, causes the brackets 72, 78, and the sensor roller 68 retained therein, to rotate counterclockwise about the axis of the associated roller 18 (also retained within brackets 72, 78), thus raising, or priming, the sensor roller 68 to a position above the operating plane of the bed of the conveyor defined by rollers 18. The primed position of sensing roller 68 is shown in FIG. 17B, 18A, and 19A, for example.

Sensor roller 68, when in its raised or primed position, may be depressed by an item, or article, being conveyed along the bed of the conveyor, as shown in FIG. 18B. Alternatively, when it is necessary to check the operation of the sensor roller for maintenance purposes and the like, the sensor roller may be manually depressed, as shown in FIG. 19B. In either instance, valve 92 bleeds off air pressure to the preceding upstream zone, thereby allowing pneumatic actuators 60 to lower lift channel 46 supporting the upper run of drive chain 24 from driving engagement with rollers 18. Also, piston 116 in primary sensor roller bracket 78 retracts into bore 218 so that the sensor roller 68 in that zone, pivots into its raised, or primed, condition, above the operating plane of rollers 18. This process continues serially, zone by zone, up the accumulating conveyor 10 until the conveyor fills up, or release of the items or articles begins at the discharge end.

To release the items retained on the accumulating conveyor, external control 224 (shown in FIG. 15) is operated and air pressure is supplied over line 226 to the pneumatic actuators 60 in the discharge zone; the actuators elevate the related lift channel 46 and bring drive chain 24 into driving relationship with rollers 18 in the discharge zone. The air pressure supplied over line 226 also pressurizes branch line 216 which communicates with bore 218 in the body of the primary sensor roller bracket 78. The pressurization of bore 218 forces piston rod 120 to project into contact with button 222 on adjacent valve 92. The area of contact between rod 120 and button 22 causes sensor roller 68 to pivot downwardly, or clockwise, to assume its "lowered state" below the operating plane of the bed of conveyor rollers 18. Valve 92, in the discharge zone, is actuated when the button 222 is forced laterally toward the body of the valve against the opposing force of spring 214. The normally closed valve 92 is thus opened, and the pressurized flow in line 212 passes through the valve and into the pair of actuators 60 in the preceding zone (Zone A in FIG. 15). Actuators 60 then elevate lift channel 46 and bring the endless drive chain 24 into driving engagement with rollers 18 in Zone A. The pressurized flow in line 212 also reaches bore 218 in the primary sensor roller bracket in Zone A, and forces the piston rod 120 in such bore into contact with button 222 of valve 92 in Zone A. Valve 92 in Zone A is then forced open, and pressurized flow through line 212 reaches the preceding zone (Zone B in FIG. 15) to repeat the process, once again. An orifice 228 in the branch line 216 leading to the bore 218 in each primary sensor roller bracket 78 retards the action of piston 116 and piston rod 120; the orifice adjusts the spacing between adjacent items for optimum results. In such fashion, the entire accumulating conveyor may be engaged with the drive chain 24, in a serial, zone-by-zone, fashion, proceeding, at appropriately timed intervals, upstream from the discharge end of the conveyor to the inlet end.

The foregoing description of the operation of accumulating conveyor 10 describes the so-called "singulation" technique for discharging items, one at a time, from conveyor 10. The conveyor may be operated at such a high rate of speed that the space permitted between individual items is reduced so that discharged items almost contact one another.

Conveyor 10 may be operated continuously, if so desired, in the non-accumulating mode, wherein drive chain 24 positively engages the conveyor rollers 18 in each and every zone along the run of the conveyor. The pressurization of actuators 60 elevates the sections of lift channel 46 in each zone, and drive chain 24 contacts the underside of each conveyor roller 18. The pressurization of the system also flows through branch lines 216 into the bores 218 in each primary sensor roller bracket 78; pistons 116 and piston rods 120 engage buttons 222 of adjacent valves 92. Sensor rollers 68; and the brackets 72, 78 retaining same; pivot clockwise downwardly to, or preferably below, the plane of the bed of conveyor rollers 18. In this "lowered" position, the articles passing down the bed either pass over the sensor rollers without depressing same, or just lightly skim over same.

In either case, sensor rollers 68 do not change the state (usually opened) of adjacent valves 92, so that the drive mechanisms for the preceding zone is not operated, as is customary with known accumulating conveyors. A relatively small amount of air is necessary to maintain the sensor rollers 68, and related brackets 72, 78, in each zone, in lowered condition. Thus, the demands of the accumulating conveyor can easily be satisfied by low pressure, low volume air lines usually found in factories, warehouses, work shops, and the like. Since the sensor rollers 68 are not contacted and/or depressed during most cycles of operation, the accumulating conveyor functions with a minimum of noise. Consequently, accumulating conveyor 10 can maintain the desired spacing, or intervals, between items traveling therealong, and can function at a level of efficiency not previously realized.

While the operation of accumulating conveyor 10 was designed for use in a "singulation" mode of operation, conveyor 10 could also be reconfigured to operate in a "slug" release mode. "Slug" release could be achieved by pressurizing a common exhaust line in the pneumatic circuit for the conveyor, or an auxiliary, release line can be furnished to link one zone in each section of the accumulator. This alternative pneumatic circuit would provide a safeguard against component failure along the run of the conveyor.

Figure 21:
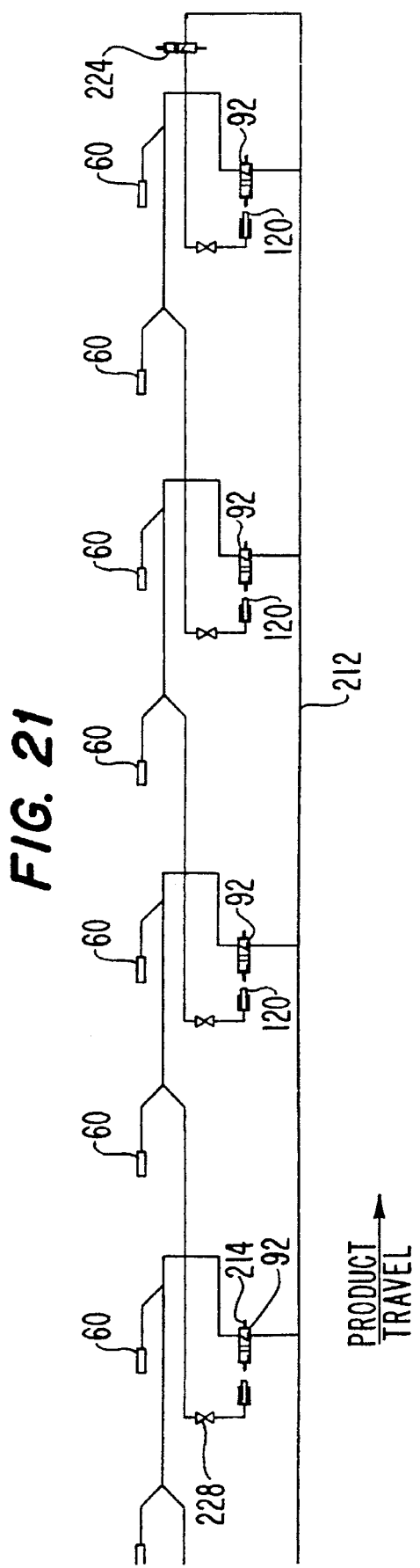
FIG. 21 is a schematic view of the pneumatic circuitry employed in a first alternative embodiment of the accumulating conveyor.

On slow speed, on line-shaft style accumulating conveyors, such as disclosed in U.S. Pat. No. 3,840,110, granted on Oct. 8, 1974 to R. P. Molt et al, the product must be driven, under power, to the sensor roller 68 (mounted within brackets 72 and 78) for coaction with valve 92 in the zone in which accumulation will occur. FIG. 21 schematically shows a pneumatic circuit adapted for utilization with such a line-shaft accumulating conveyor. The circuit of FIG. 21 differs from the circuit of FIG. 15 in that valve 92 (which may also be designated as a control valve) is connected to actuators 60 in the same zone that the valve is located in, and that line 212 is also connected to piston 116 of the next upstream sensor roller. By virtue of this pneumatic circuitry, during accumulation, the power to the rollers of the zone is maintained until the sensor roller in that particular zone is depressed.

FIG. 22 schematically shows an additional pneumatic circuit that allows for several starting points of accumulation. A potential problem of the normally down sensor accumulation method (shown in FIGS. 1–7 and 16A–19B) may occur when a sensor roller and related switch 92 fail to disengage the upstream zone. On long runs of accumulation the whole line could remain live roller (not accumulating). To cure this problem the conveyor could be divided into smaller groups of zones, controlled by a secondary air line, which allows the first sensor in each group of zones to initiate accumulation or release.

Other variations, modifications, and revisions to the basic configuration of accumulating conveyor 10 will occur to the skilled artisan. For example, while drive chain 24, with removable drive pads 172 is admirably suited for driving rollers 18, other endless chains, belts, line-shafts or other methods of driving a conveyor would also function satisfactorily. Alignment features other than lug 94 on primary sensor roller bracket 78 and the cut-outs in valve bracket 82 could be used to retain the primary brackets and valves 92 in proper relationship. The bore within the body of the primary sensor roller bracket may include a stepped-tapered bore to facilitate assembly of the piston therewith. While only endless drive chain 24 is disclosed, two chains, one on each side of the conveyor, could also be used. Hence the appended claims should be literally construed in a manner commensurate with the scope of the inventive efforts and should not be unduly limited to their exact, literal, terms.

We claim:

1. A drive chain arrangements; comprising:
   a) a chain assembly including a plurality of chain links having at least first and second ends and a plurality of pairs of connecting plates;
   b) each plate of said plurality of pairs of connecting plates having first and second surfaces terminating in first and second ends and including at least a first edge surface extending between said first and second ends of each plate;
   c) said pairs of connecting plates and said chain links alternating in disposition and being articulatably connected together proximate respective ends thereof to form a predetermined length of articulatable chain; and
   d) a plurality of drive pads carried by said chain assembly in single file alignment along the length of said chain assembly so as to position drive surfaces of a pad portion of each of said drive pads in a common plane and so as to position first and second ends of said drive pads proximate respective first and second ends of others of said drive pads when so carried by said chain assembly;
   e) each of said drive pads being carried by a respective one of said pairs of connecting plates with said first ends of said pads extending over at least a portion of the chain link to which said first ends of said pair of connecting plates are connected to and with said second ends of said pads extending over at least a portion of the chain link to which said second ends of said pair of connecting plates are connected to;
   f) each of said drive pads having a side to side width for at least a predetermined portion thereof that extends substantially over, but not substantially beyond, said respective edge surfaces of said pairs of connecting plates.

2. The drive chain arrangement of claim 1, wherein each of said pairs of connecting plates are formed with substantially square upper corners at said first and second ends and each of said drive pad means includes a surface disposed in proximity thereto and for coaction therewith.

3. The drive chain arrangement of claim 1, wherein at least one connecting plate of each of said pairs of connecting plates has a notch formed therein and each of said drive pads carries at least a projection disposed to coact with said notch.

4. The drive chain arrangement of claim 1, wherein at least one of said connecting plates of each of said pairs of connecting plates has an opening formed therethrough and wherein each of said drive pads includes at least one tongue extending from its said pad portion in proximity to said connecting plate and a lug projecting from said tongue for cooperation with said opening.

5. The drive chain arrangement of claim 4, wherein each of said connecting plates of each pair of connecting plates has an opening formed therethrough.

6. The drive chain arrangement of claim 5, wherein each drive pad includes a pair of tongues, each such tongue extending from its said pad portion proximate a respective one of said connecting plates and a lug projecting from each of said tongues for cooperation with the opening in the connecting plate disposed in proximity thereto.

7. The drive chain arrangement of claim 6, wherein each of said openings is in the configuration of an elongated slot and each of said lugs is elongated and of a size and configuration to seat in its respective slot.

8. The drive chain arrangement of claim 1, wherein said chain links are standard roller chain links and a plurality of arcuate saddles are defined beneath said pad portion of each of said drive pads in alignment with the rollers of said roller chain links.

9. The drive chain arrangement of claim 1, wherein said drive surfaces of said drive pads are to be disposed for coaction with the conveying means of a conveyor to impart motive power to the conveying means.

10. The drive chain arrangement of claim 9, wherein the conveying means comprise a plurality of conveyor rollers.

11. A drive chain arrangement; comprising:
(a) a chain assembly including a plurality of chain links having at least first and second ends and a plurality of pairs of connecting plates;
(b) each plate of said plurality of pairs of connecting plates having first and second surfaces terminating in first and second ends and including at least a first edge surface extending between said first and second ends of each plate;
(c) said pairs of connecting plates and said chain links alternating in disposition and being articulatably connected together proximate respective ends thereof to form a predetermined length of articulatable chain;
(d) a plurality of drive pads carried by said chain assembly in single file alignment along the length of said chain assembly so as to position drive surfaces of said drive pads in a common plane and so as to position first and second ends of said drive pads proximate respective first and second ends of others of said drive pads when so carried by said chain assembly;
(e) each of said drive pads being carried by a respective one of said pairs of connecting plates with said first ends of said pads extending over at least a portion of the chain link to which said first ends of said pair of the chain link to which said first ends of said pair of connecting plates are connected to and with said second ends of said pads extending over at least a portion of the chain link to which said second ends of said pair of connecting plates are connected to;
(f) each of said drive pads, in planar configuration, having a parallelpiped shape providing first and second right triangle end areas for said drive pads with a substantially rectangular area therebetween and with the respective hypotenuses of said first and second right triangle end areas parallel one with respect to the other, each of said first and second right triangle end areas having a relatively short side and a relatively long side, said relatively short sides of each said first and said second right triangle end areas being extensions of respective parallel side edges of said substantially rectangular area with each such short side extending a distance relatively shorter than that of said respective edge of said rectangular area.

12. The drive chain arrangement of claim 11, wherein said chain links are standard roller chain links and said relatively short sides of said triangle end portions respectively extend a relatively small distance over the preceeding and succeeding links.

13. The drive chain arrangement of claim 12, wherein said roller chain links are standard single pitch roller chain links and said connecting plates are longer than single pitch.

14. The drive chain arrangement of claim 13, including a plurality of parallel grooves formed in said drive surfaces of said drive pads.

15. A drive chain arrangement; comprising:
a) a chain assembly including a plurality of chain links having at least first and second ends and a plurality of pairs of connecting plates;
b) each plate of said plurality of pairs of connecting plates having first and second surfaces terminating in first and second ends and including at least a first edge surface extending between said first and second ends of each plate;
c) said pairs of connecting plates and said chain links alternating in disposition and being articulatably connected together proximate respective ends thereof to form a predetermined length of articulatable chains;
d) a plurality of drive pads carried by said chain assembly in single file alignment along the length of said chain assembly so as to position drive surfaces of a pad portion of each of said drive pads in a common plane and so as to position first and second ends of said drive pads proximate respective first and second ends of others of said drive pads when so carried by said chain assembly;
e) each of said drive pads being carried by a respective one of said pairs of connecting plates with said first ends of said pads extending over at least a portion of the chain link to which said first ends of said pair of connecting plates are connected to and with said second ends of said pads extending over at least a portion of the chain link to which said second ends of said pair of connecting plates are connected to;
f) each of said connecting plates, of each of said pairs of connecting plates, having an opening formed therethrough in the configuration of an elongated slot;
g) each of said drive pads including a pair of tongues, respective ones of said tongues extending from its said pad portion in proximity to a connecting plate and an elongated lug of a size and configuration to seat in a respective slot projecting from each said tongue cooperation with the opening in the connecting plate disposed in proximity thereto; and
h) each connecting plate being formed with a notch in said first edge surface thereof and each drive pad carrying a pair of projections each disposed for coasting with one of said notches.

16. The drive chain arrangement of claim 15, wherein said connecting plates of each pair of connecting plates are disposed in parallel planes and spaced one from the other and wherein said tongues extend into said space between said connecting plates.

17. The drive chain arrangement of claim 15, wherein each of said drive pads, in planar configuration, has a parallelpiped shape providing first and second right triangle end areas for said drive pads with a substantially rectangular area therebetween and with the respective hypotenuses of said first and second right triangle end areas parallel one with respect to the other, each of said first and second right triangle end areas having a relatively short side and a relatively long side, said relatively short sides of each said first and said second right triangle end areas being extensions of respective parallel side edges of said substantially rectangular area with each such short side extending a distance relatively shorter than that of said respective edge of said rectangular area.

18. The drive chain arrangement of claim 17, wherein said roller chain links are standard single pitch roller chain links and said connecting plates are longer than single pitch.

19. The drive chain arrangement of claim 18, including a plurality of arcuate saddles defined beneath said pad portion of each of said drive pads in alignment with the rollers of said roller chain links.

20. A drive chain arrangement; comprising:
(a) a chain assembly including a plurality of chain links having at least first and second ends and a plurality of pairs of connecting plates;
(b) each plate of said plurality of pairs of connecting plates having first and second surfaces terminating in first and second ends and including at least a first edge surface extending between said first and second ends of each plate;
(c) said pairs of connecting plates and said chain links alternating in disposition and being articulatably connected together proximate respective ends thereof to form a predetermined length of articulatable chain; and (d) a plurality of drive pads carried by said chain assembly in single file alignment along the length of said chain assembly so as to position drive surfaces each of said drive pads in a common plane and so as to position first and second ends of said drive pads proximate respective first and second ends of others of said drive pads when so carried by said chain assembly;

(e) each of said drive pads, in planar configuration, having a parallelpiped shape providing first and second right triangle end areas for said drive pads with a substantially rectangular area therebetween and with the respective hypotenuses of said first and second right triangle end areas parallel one with respect to the other, each of said first and second right triangle end areas having a relatively short side and a relatively long side, said relatively short sides of each said first and said second right triangle end areas being extensions of respective parallel side edges of said substantially rectangular area with each such short side extending a distance relatively shorter than that of said respective edge of said rectangular area.

21. The drive chain arrangement of claim 20, including a plurality of parallel grooves formed in said drive surfaces of said drive pads.

22. The drive chain arrangement of claim 20, wherein said chain links are standard roller chain links and a plurality of arcuate saddles are defined beneath said pad portion of each of said drive pads in alignment with the rollers of said roller chain links.

23. The drive chain arrangement of claim 22, wherein said saddles are substantially semi-circular and there are two spaced saddles proximate said first end of each of said drive pads and two spaced saddles proximate said second end of each said drive pads.

24. A drive chain for use in a conveyor, said drive chain comprising:

a) arcuate roller links;

b) a pair of parallel side plates, one plate located on each side of said roller links;

c) pins extending through said side plates and said roller links so that said roller links may pivot relative to said parallel side plates;

d) a slot formed in each side plate between adjacent ones of said roller links;

e) a molded plastic drive pad comprising a planar upper surface, and a pair of tongues depending below said pad;

f) projections extending laterally outwardly from said tongues;

g) said drive pad being seated across the upper surface of said side plates by forcing said tongues downwardly between said side plates until said projections snap into said slots; and h) an upwardly opening notch formed in the upper surface of each side plate, and a centrally located projection formed adjacent each edge of the drive pad, said projections being seated within said notches when said drive pad is secured to said side plates, to stabilize said drive pad.

25. A drive chain arrangement; comprising:

a) a chain assembly including a plurality of chain links having at least first and second ends and a plurality of pairs of connecting plates;

b) each plate of said plurality of pairs of connecting plates having first and second surfaces terminating in first and second ends and including at least a first edge surface extending between said first and second ends of each plate;

c) said pairs of connecting plates and said chain links alternating in disposition and being articulatably connected together proximate respective ends thereof to form a predetermined length of articulatable chain;

d) a plurality of drive pads carried by said chain assembly in single file alignment along the length of said chain assembly so as to position drive surfaces of a pad portion of each of said drive pads in a common plane and so as to position first and second ends of said drive pads proximate respective first and second ends of others of said drive pads when so carried by said chain assembly;

e) each of said drive pads being carried by a respective one of said pairs of connecting plates with said first ends of said pads extending over at least a portion of the chain link to which said first ends of said pair of connecting plates are connected to and with said second ends of said pads extending over at least a portion of the chain link to which said second ends of said pair of connecting plates are connected to;

f) at least one connecting plate of each of said pairs of connecting plates having a notch formed in said first edge surface thereof and each of said drive pads carrying at least a projection disposed to extend from a surface beneath said pad portion for coaction with said notch.

26. The drive chain arrangement of claim 25, wherein each of the connecting plates of each pair of connecting plates has a notch formed in said first edge surface thereof.

27. The drive chain arrangement of claim 26, wherein each drive pad includes a pair of projections extending from said surface beneath said pad portion, each such projection being disposed for coaction with a respective notch of a connecting plate.

28. A drive chain arrangement; comprising:

a) a chain assembly including a plurality of chain links having at least first and second ends and a plurality of pairs of connecting plates;

b) each plate of said plurality of pairs of connecting plates having first and second surfaces terminating in first and second ends and including at least a first edge surface extending between said first and second ends of each plate;

c) said pairs of connecting plates and said chain links alternating in disposition and being articulatably connected together proximate respective ends thereof to form a predetermined length of articulatable chain;

d) a plurality of drive pads carried by said chain assembly in single file alignment along the length of said chain assembly so as to position drive surfaces of a pad portion of each of said drive pads in a common plane and so as to position first and second ends of said drive pads proximate respective first and second ends of others of said drive pads when so carried by said chain assembly;

e) each of said drive pads being carried by a respective one of said pairs of connecting plates with said first ends of said pads extending over at least a portion of the chain link to which said first ends of said pair of connecting plates are connected to and with said second ends of said pads extending over at least a portion of the chain link to which said second ends of said pair of connecting plates are connected to; and f) a plurality of parallel grooves formed in said drive surfaces of said drive pads.

29. A drive chain arrangement; comprising:

a) a chain assembly including a plurality of standard roller chain links having at least first and second ends and a plurality of pairs of connecting plates;

b) each plate of said plurality of pairs of connecting plates having first and second surfaces terminating in first and second ends and including at least a first edge surface extending between said first and second ends of each plate;

c) said pairs of connecting plates and said chain links alternating in disposition and being articulatably connected together proximate respective ends thereof to form a predetermined length of articulatable chain;

d) a plurality of drive pads carried by said chain assembly in single file alignment along the length of said chain assembly so as to position drive surfaces of a pad portion of each of said drive pads in a common plane and so as to position first and second ends of said drive pads proximate respective first and second ends of others of said drive pads when so carried by said chain assembly;

e) each of said drive pads being carried by a respective one of said pairs of connecting plates with said first ends of said pads extending over at least a portion of the chain link to which said first ends of said pair of connecting plates are connected to and with said second ends of said pads extending over at least a portion of the chain link to which said second ends of said pair of connecting plates are connected to;

f) a plurality of arcuate saddles defined beneath said pad portion of each of said drive pads in alignment with the rollers of said roller chain links;

g) said saddles being substantially semi-circular with two spaced saddles proximate said first end of each of said drive pads and two spaced saddles proximate said second end of each of said drive pads.

* * * * *